United States Patent [19]

Leeds et al.

[11] Patent Number: 5,054,994
[45] Date of Patent: Oct. 8, 1991

[54] APPARATUS FOR STACKING UNFIRED BRICK

[75] Inventors: Harry D. Leeds; Raymond F. Thompson, both of Clarksville, Ark.

[73] Assignee: Arkansas Technologies, Inc., Clarksville, Ark.

[21] Appl. No.: 258,795

[22] Filed: Oct. 17, 1988

[51] Int. Cl.$^5$ ............................................ B65G 57/10
[52] U.S. Cl. ............................ 414/793.4; 198/459; 414/931
[58] Field of Search ............ 198/459; 414/931, 793.4, 414/791.6

[56] References Cited

U.S. PATENT DOCUMENTS

| | | | |
|---|---|---|---|
| 4,144,977 | 3/1979 | Lingl, Jr. et al. | 414/931 X |
| 4,173,910 | 11/1979 | Lineberry et al. | 414/931 X |
| 4,211,130 | 7/1980 | Buckner et al. | 414/931 X |
| 4,326,439 | 4/1982 | Frost et al. | 414/931 X |
| 4,342,531 | 8/1982 | Cox et al. | 414/931 X |
| 4,423,807 | 1/1984 | Muller | 198/459 X |

Primary Examiner—Robert J. Spar
Assistant Examiner—Janice Krizek
Attorney, Agent, or Firm—Rhodes, Coats & Bennett

[57] ABSTRACT

A technique for cutting and selectively edge, face or flat setting brick or similar articles. The machine includes a cutter bank for receiving the slugs from a pusher and a device for selectively moving the cutter bank between an operable position and an inoperable position with respect to the pusher. An elevator is located downstream of the cutter bank for receiving bricks from the cutter bank. A controller is connected to the pusher and the elevator whereby the pusher and the elevator are operated in a cooperative relationship. The machine includes a conveyor assembly having a plurality of parallel, spaced-apart belts for moving the bricks, a stop for stopping the movement of bricks therepast, a lift disposed between the conveyor belts for lifting and redepositing a portion of the bricks, and a controller connected to the conveyor assembly, stop, and lift whereby the conveyor assembly, stop, and lift are sequentially operated in a cooperative relationship to set the rows of brick in pre-determined patterns. A turnover rotor, disposed between the conveyor belts and adjacent to the stop, is operable to lift, rotate 90 degrees and redeposit a portion of the bricks downstream of the stop and may be selectively moved between an operable position and an inoperable position with respect to the conveyor belt.

26 Claims, 15 Drawing Sheets

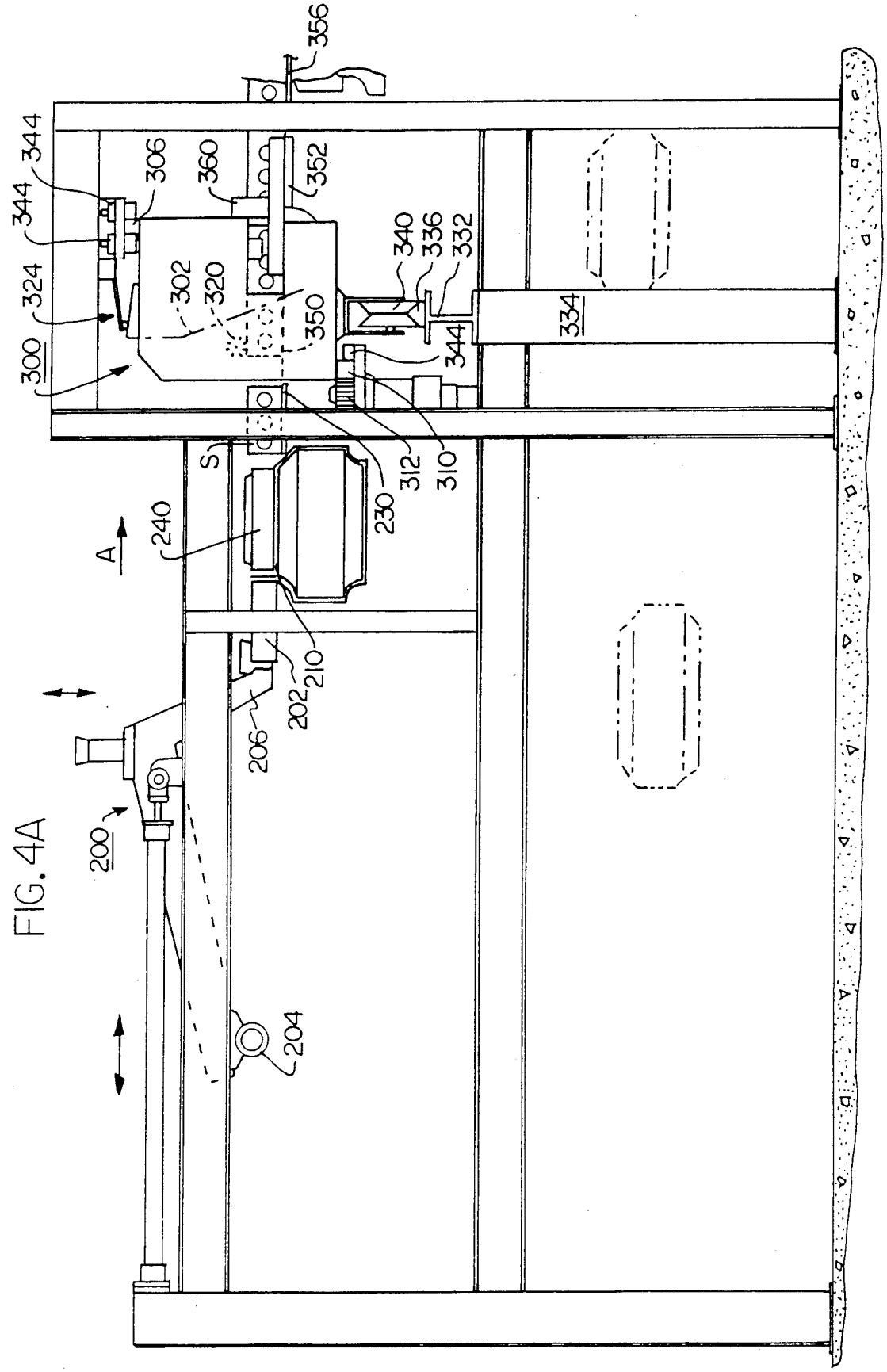

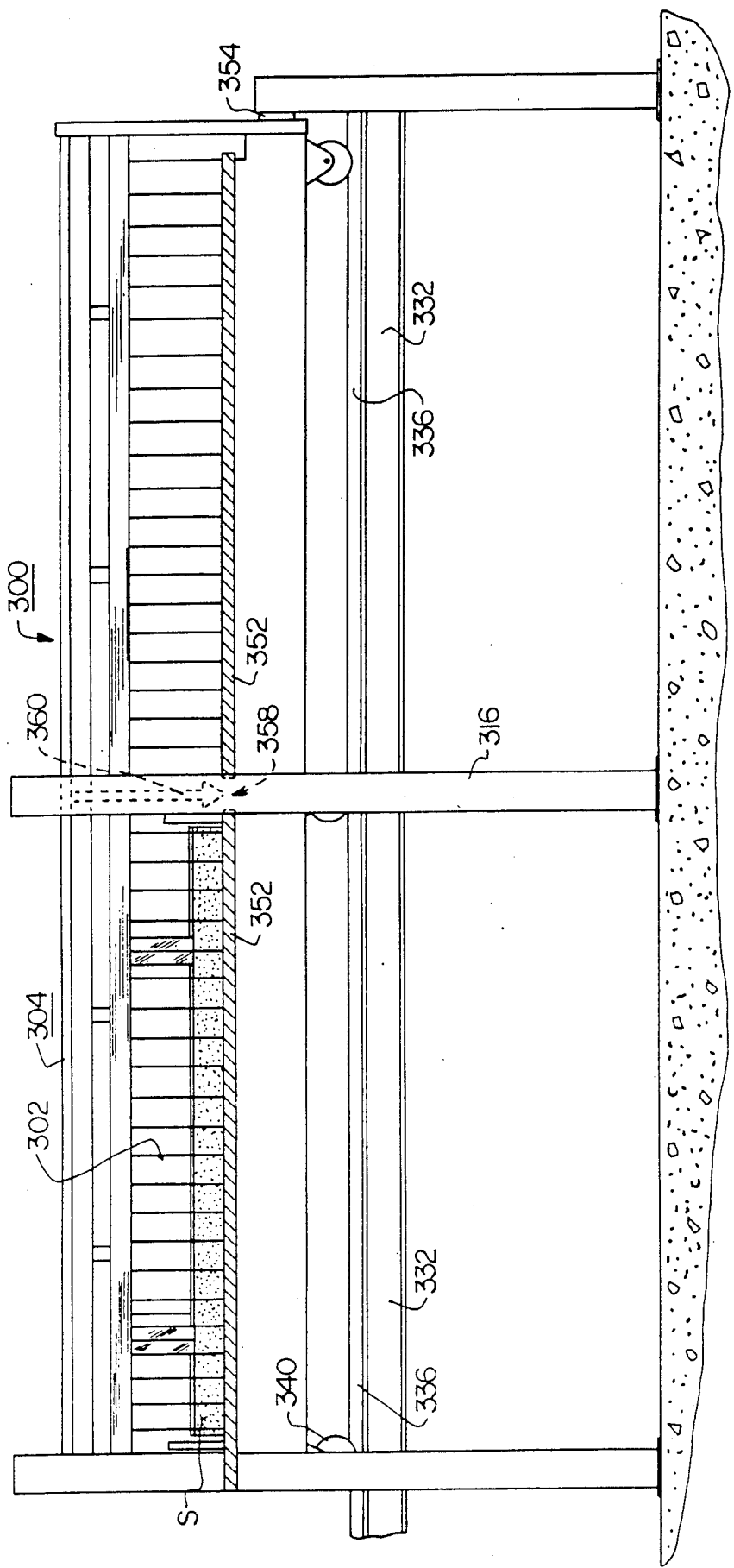

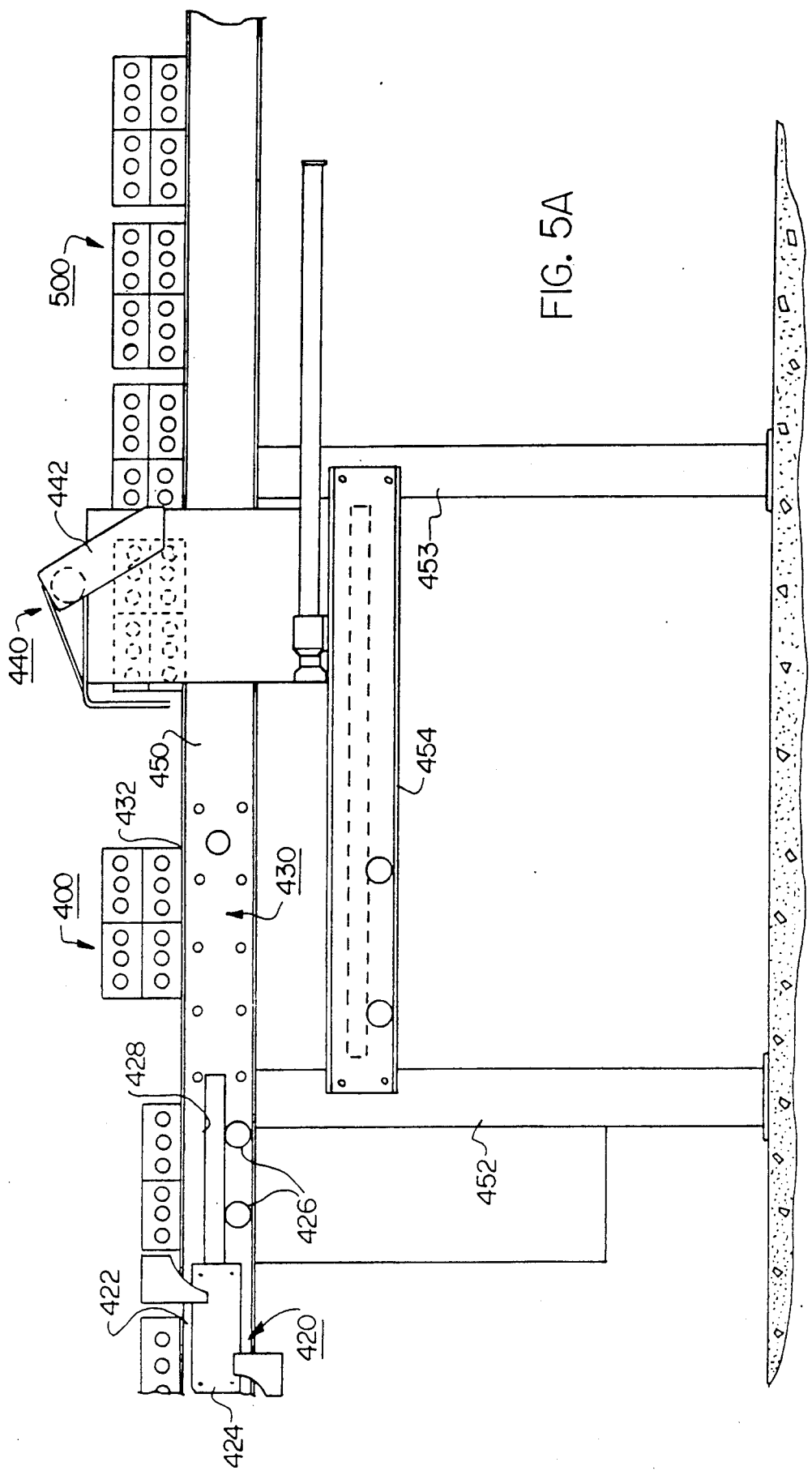

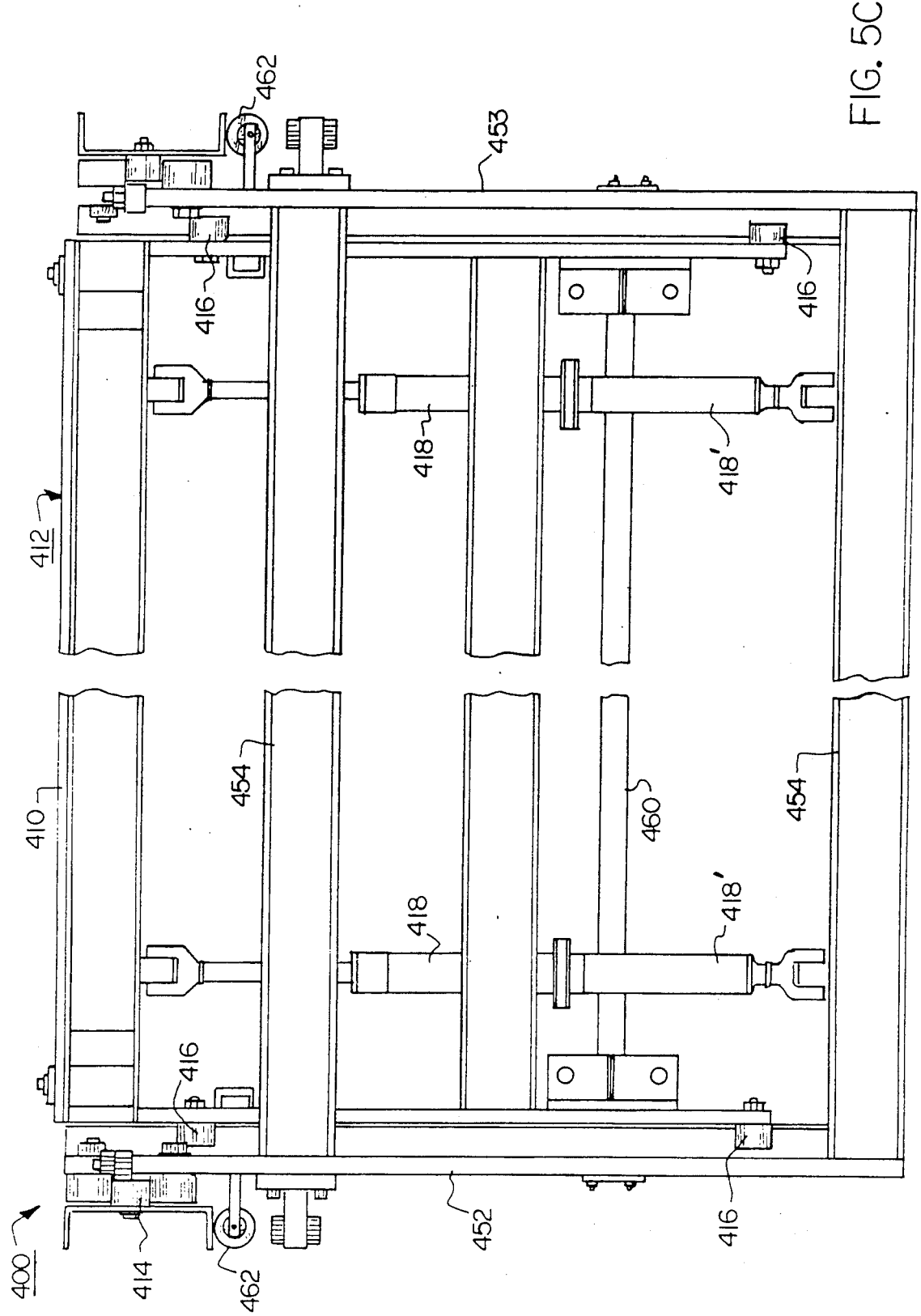

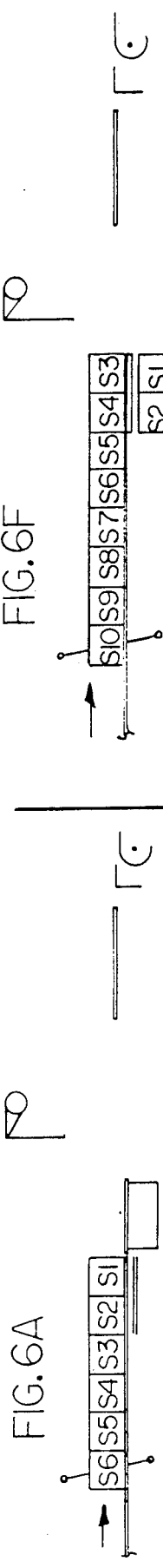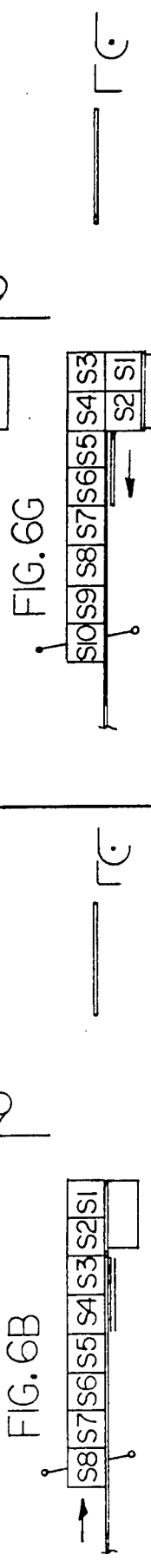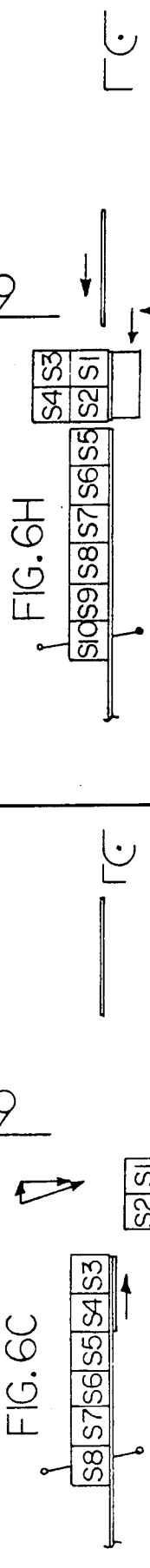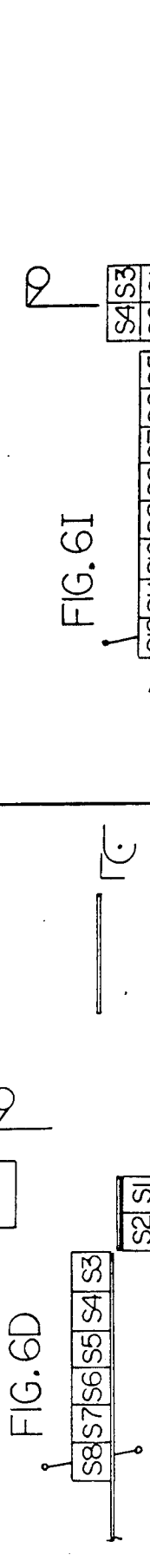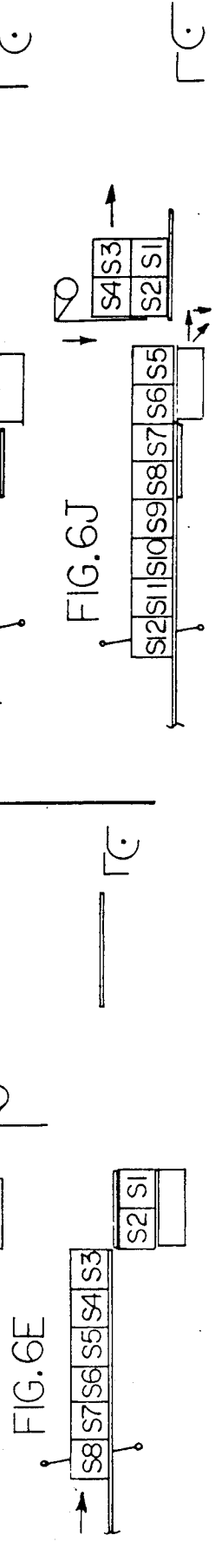
FIG.6F  FIG.6G  FIG.6H  FIG.6I  FIG.6J
FIG.6A  FIG.6B  FIG.6C  FIG.6D  FIG.6E

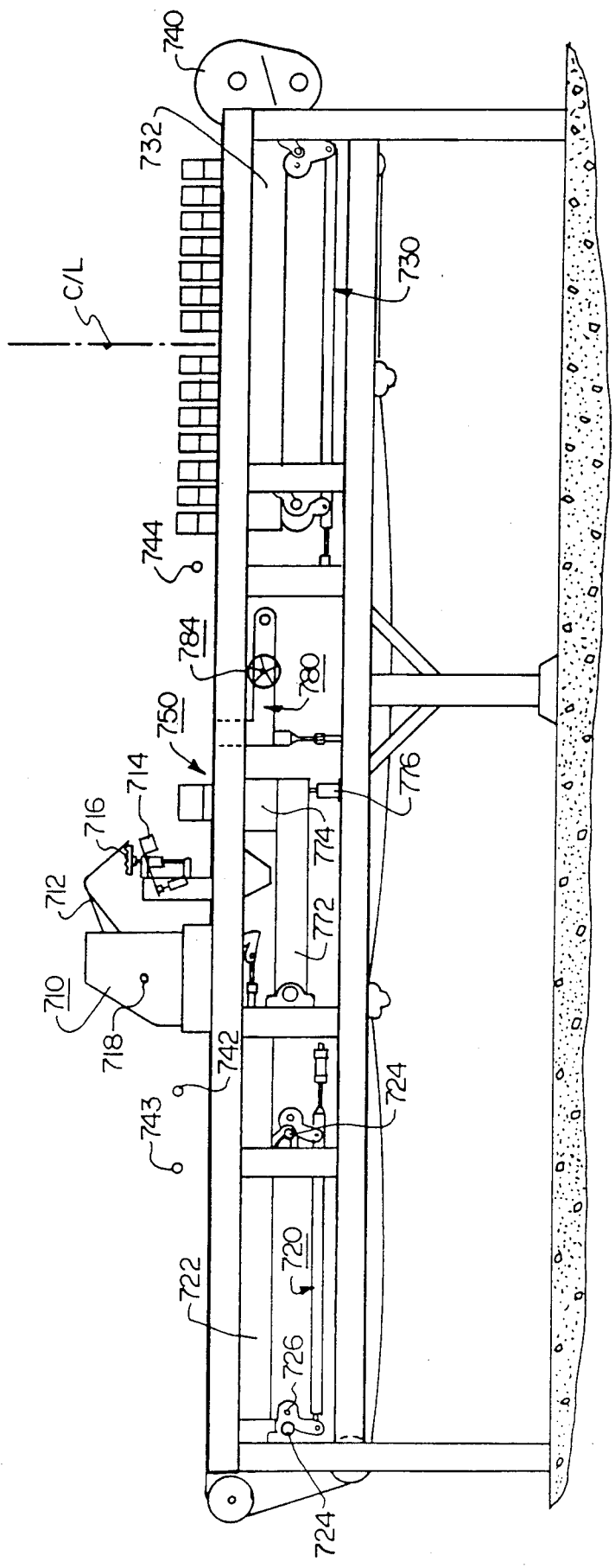

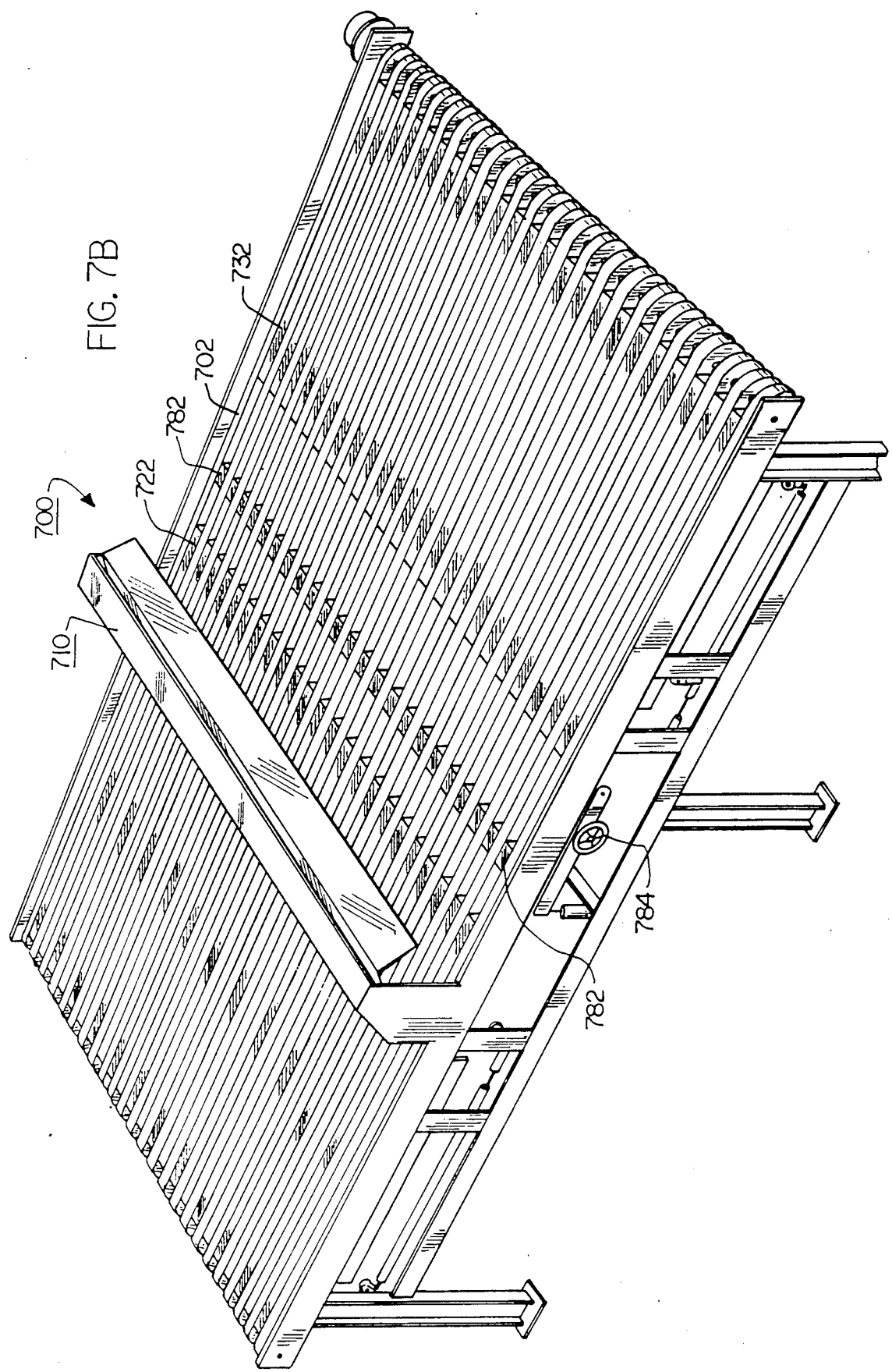

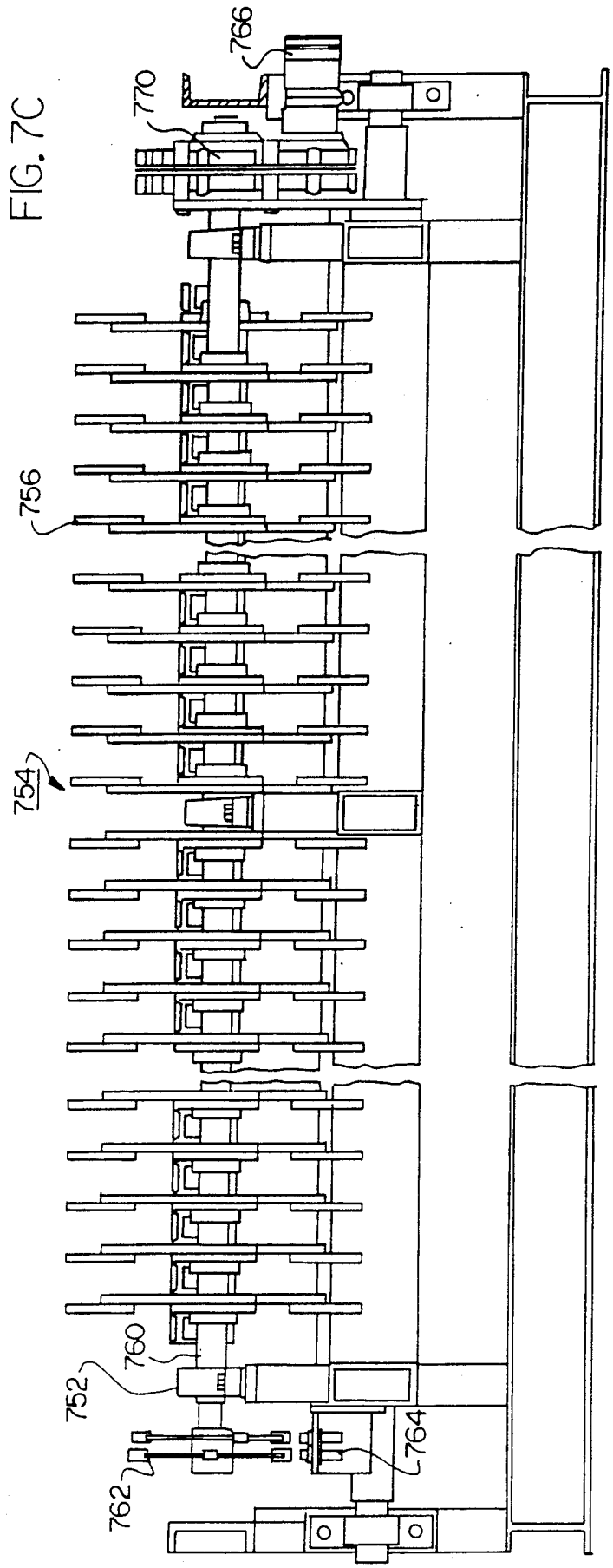

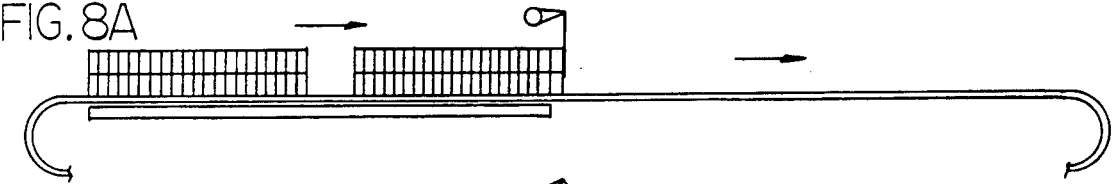
FIG. 8A
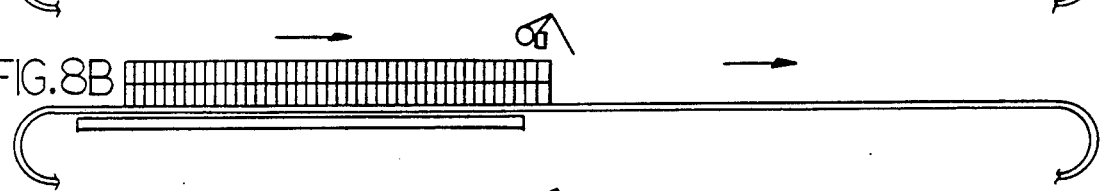
FIG. 8B
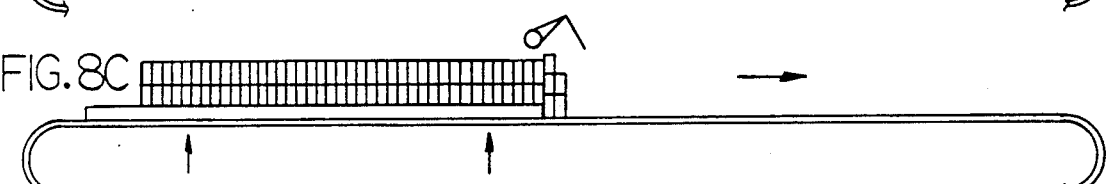
FIG. 8C
FIG. 8D
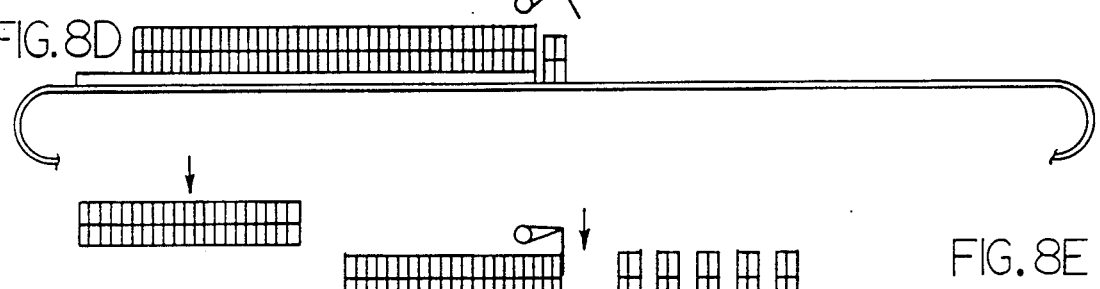
FIG. 8E
FIG. 8F
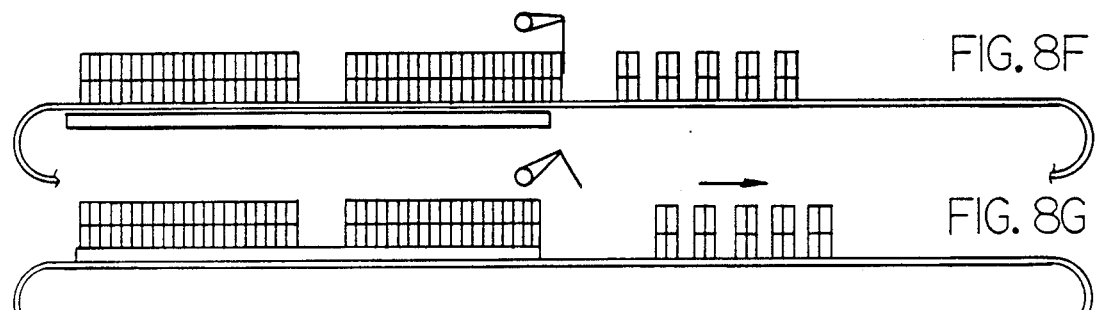
FIG. 8G
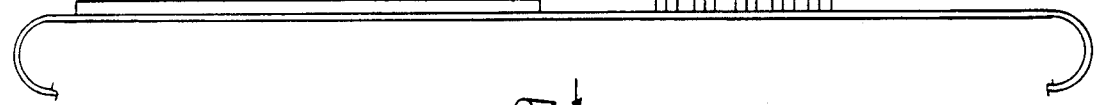
FIG. 8H
FIG. 8I
FIG. 8J
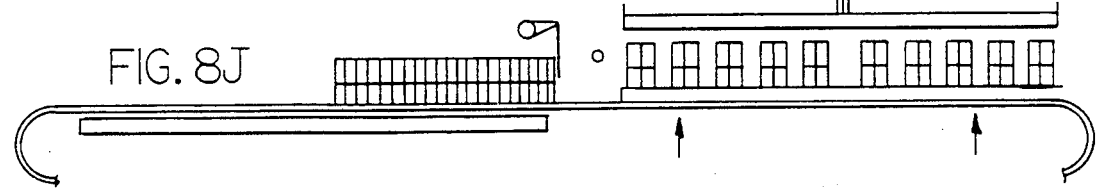
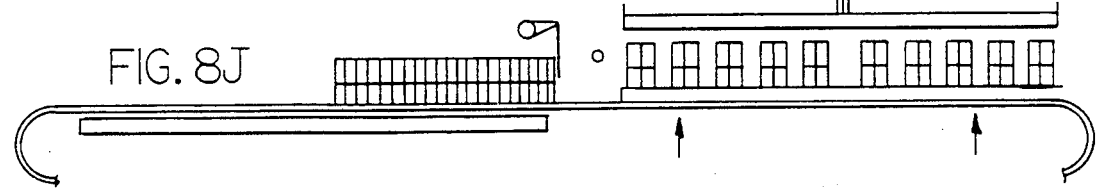

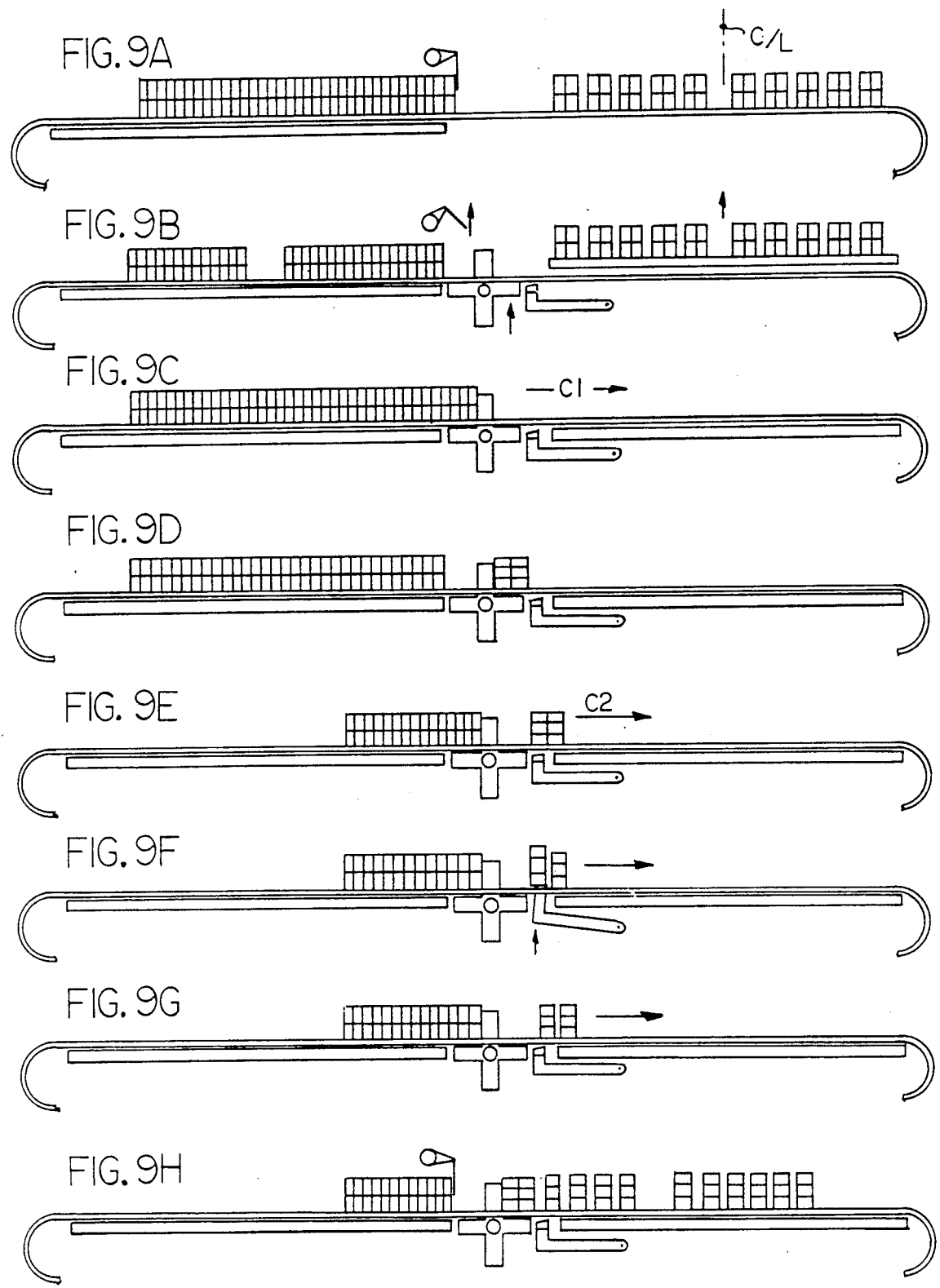

APPARATUS FOR STACKING UNFIRED BRICK

BACKGROUND OF THE INVENTION (1) Field of the Invention

The present invention relates generally to the manufacture of building products and in particular to a novel brick setting method and apparatus for cutting, stacking and setting unfired bricks on a kiln car prior to firing.

(2) Description of the Prior Art

Because of the variability of the raw materials used in the manufacture of bricks, it is inherently difficult to produce a consistant quality end product. Thus, over the years brick manufacturers have resorted to a number of quality control practices to reduce this variability to a minimum. For example, clay pits are carefully mapped out to identify various regions of similar clays in the mine. These regions are selectively mined and stockpiled. At the brick manufacturing plant itself, the raw materials are carefully blended and mixed in order to minimize variation over a period of years. These practices are necessary in order to minimize variations which can occur over a period of years. These practices are necessary in order that builders can match brick in new additions or replacements for a home that was often built ten, twenty, or even thirty years earlier.

Assuming that proper steps have been taken in mining, stockpiling, blending and mixing, it is important that the cutting, stacking and setting steps of the brick making process also be carefully controlled to avoid undoing the benefit of the care taken before. As the green bricks are formed and cut, they are typically stacked and restacked several times prior to being fired. This sequence of operations, similar to shuffling a deck of cards, is also critical to minimizing variability.

After forming and stacking, the bricks are loaded onto a kiln car prior to firing. The "green" bricks are set in an open lattice arrangement in order that the bricks on the interior of the brick stack receive a similar heat treatment as the bricks on the exterior of the brick stack. Otherwise, additional product variability will be introduced. Thus, the brick maker's unending task is to reduce or minimize the inherent variability in his craft.

Presently bricks are cut by one of two procedures and set by one of three procedures. In the first cutting method, a continuous slab of clay having cross-sectional dimensions equal to the length and width of a brick is continously extruded from the pug mill. As the clay slab is extruded, a rotating wire cuts the clay into individual bricks. The bricks then move down an offbearing conveyor to the end of the conveyor where they are assembled into rows of the desired number of bricks. The bricks are then pushed transversely onto a marshalling table where the rows of bricks are stacked in double layers with the upper layer being inverted in an operation called "facing". The double-layer rows are then assembled and delivered by some type of setter head into a kiln car prior to firing.

In the second cutting method, clay slugs are extruded and cut to a prescribed length. The slugs then proceed down the off-bearing conveyor on which they are stacked, one on top of the other, and then pushed through a stationary wire cutter onto a marshalling or spread table. As the slugs are passed through the wire cutter, each slug is cut into a row of bricks in one operation and delivered onto the spread table. As a plurality of rows of bricks are accumulated on the marshalling spread table, a setter head lifts and transfers several double-layer rows at a time onto a kiln car. An example of such a system is disclosed in U.S. Pat. No. 3,589,495 issued to Pearne et al.

In either cutting method, one and sometimes two operations must be performed because of the manner in which the bricks are cut. First, either the slugs or the cut rows of brick must be stacked into double-layer rows or group of rows called "courses". These double-layer rows are subsequently transferred to the kiln car. Secondly, the upper layer of each row may be inverted in an operation called "facing" to protect the finished sides of the bricks as they are fired.

In the previously mentioned Pearne et al patent, the row of slugs are stacked and faced, and then pushed through the wire cutter to form the individual bricks. Pushing a double-layer slug through a wire cutter may cause distortion in the edge of the bricks, as it is difficult to push that size and weight of clay successfully through the wire while making a clean cut. Thus, some systems push only a single layer row of bricks through the wire cutters and then perform the stacking and facing operation afterwards. One system for stacking and facing cut rows of brick subsequent to the cutting operation prior to the delivery of the setter head is disclosed in U.S. Pat. No. 4,326,439 issued to Frost et al.

As previously mentioned, there are three commonly used systems for stacking brick. The first and simplest system involves the formation of rows of pairs of bricks with a lower brick now positioned with its finished face upward and an upper brick row positioned on the lower brick row with its finished face also positioned on the upper side. Such a setting system is usually referred to as "edge setting", "stacking", or "stacking without facing."

The second commonly used system involves inverting the upper brick on the lower brick so that the finished face of the lower brick row engages and supports the finished face of the upper brick row. Such a system is generally referred to as "face setting", and includes the additional steps of inverting previously discussed.

The third system for forming stacks of bricks is known as flat setting. In such a system, rows of two or more bricks rest on each other with the bricks of each row lying on their side so that the brick faces are exposed.

Most prior art inverters and/or stackers have included grippers which grip the brick during the stacking operation. Such gripping often causes damage and results in high scrap rate. Also gripping can cause small fractions in the surface of the brick which are not noticeable which cause brick to deteriorate when water enters and freezes and thaws in use. Some brick stacking systems do not require gripping. One such system which describes an inverter without gripping is shown in U.S. Pat. No. 4,342,531 issued to Cox et al. Another well-known system is shown in U.S. Pat. No. 4,173,910 issued to Lineberry et al. Neither of these systems can selectively face set or stack without facing, however, systems which can edge or flat set are disclosed in U.S. Pat. No. 4,144,977 issued to Lingl et al. and U.S. Pat. No. 4,669,968 issued to Milholen.

Because of the multiplicity of the steps in brick making even small gains in efficiency or increases in the flexibility of the process are magnified throughout subsequent steps in the process. For example, in the cutting process of current brickmaking machines, the entire process must be shutdown when the operator switches between 8 inch brick (modular/closures), 10 inch brick (king-size), and 12½ inch brick (normal). These are nominal dimensions and will vary depending on the shrinkage of the green product during the process. This stoppage is necessary in order that the spacing of the wire cutter can be changed for each style. Since the changeover process can take several hours, there is a need for a cutting apparatus which is readily selectable between more than one size of brick.

In addition to the cutting operation, there is also a need for a quick change over in the stacking/setting operation from either edge or face setting to flat setting, without interferring with the high operating speed of the setting machine operation. Previous machines have either been too slow to perform the sequence of operations or had been unreliable in properly positioning the stacked bricks. Since there are advantages to be had in forming hacks having interspersed courses of both edge or face set and flat set bricks, there is a need for an improved system for reliably performing such an operation. In addition such changes should be achieved automatically by means of program control to provide any desired mixture of edge and flat setting in the brick hack.

SUMMARY OF THE INVENTION

The present invention solves the aforementioned problems associated with the prior art by providing a technique which permits the setting of brick or the like on a platform, such as the kiln car, in which the courses within the hack can be either edge set, face set, or flat set.

In particular, the present invention includes novel cutter, elevator/stacker and separation conveyor assemblies which permit the selective processing of the brick and, at the same time, provides for a very short changeover time in order that very high production rates are attained.

The cutter assembly of the present invention includes a pair of side-by-side cutter banks and means for selectively moving the cutter banks between an operable and inoperable position with respect to the machine. As a result, one cutter bank is always in position and the other cutter bank is always out of position where it may be repaired or reconfigured for a different size brick without the need for stopping the entire production line.

The stacker/elevator assembly of the present invention is located adjacent to the pusher/cutter assembly and receives the slugs directly from the cutter assembly. The pusher and stacker/elevator assembly are operated in a cooperative relationship such that slugs are delivered to and displaced from the stacker/elevator by the movement of the next slug from the pusher, thereby reducing the number of components and complexity of the stacker/elevator assembly may be filled with a conventional "face" setter to permit selectively face or edge setting.

The separation conveyor assembly of the present invention includes a conveyor made up of a plurality of parallel, spaced-apart continuous belts driven by a servo-electric motor. A stop and hold-down assembly is located approximately in the middle of the conveyor for stopping the movement of the bricks therepast and providing a know reference point. Lifting bars are located both upstream and downstream of the stop assembly for lifting and redepositing a portion of the bricks from the conveyor. A programmable controller is connected to the conveyor motor, stop assembly and lifting bars for sequentially operating the motor, stop assembly and lifting bars to space the brick apart at pre-determined intervals as the bricks are conveyed downstream. In the preferred embodiment, the separation conveyor assembly includes a turnover assembly disposed between the conveyor located downstream of the stop assembly. The turnover assembly may be selectively moved between an operable and inoperable position with respect to the conveyor to selectively permit edge or flat setting. Thus, when combined with a conventional face setter, the present invention permits selective face, edge or flat setting with a very short changeover time.

Accordingly, one aspect of the present invention is to provide a machine for cutting extruded slugs of unfired brick having a cutter assembly that may be selectively moved between an operable and unoperable position to permit repair without stopping the entire production line.

Another aspect of the present invention is to provide an apparatus for stacking unfired brick having a stacker/elevator assembly operated in cooperative means with the pusher/cutter assembly such that slugs are delivered to and discharged from the stacker/elevator assembly by the movement of the next slug by the pusher.

Still another aspect of the present invention is to provide a separation conveyor for receiving and grasping rows of unfired brick having a plurality of parallel, spaced-apart continuous belts which is operable to selectively edge or flat set the product.

These and other aspects of the present invention will be more clearly understood after a review of the following description of the preferred embodiment, when considered with the drawings.

In addition, individual brick can be provided with face and/or edge treatment to produce brick of substantially any desired style. For example, a "handmade" molded brick can be produced by forming a pair of textured edges along the finished face of the brick.

BRIEF DESCRIPTION OF THE DRAWINGS

FIGS. 4A through 4C are enlarged views illustrating the pusher/cutter assembly of the present invention.

FIGS. 5A through 5C are enlarged views illustrating the stacker/elevator assembly of the present invention.

FIGS. 6A through 6J schematically illustrate the brick movement through successive stages of the cutting/stacking operation.

FIGS. 7A through 7C are enlarged views illustrating the separation conveyor assembly of the present invention.

FIGS. 8A through 8J schematically illustrate the brick movement through successive stages during the edge or face setting operation.

FIGS. 9A through 9H schematically illustrate the brick movement through successive stages during the flat setting operation.

DETAILED DESCRIPTION OF THE PREFERRED EMBODIMENT

Figure 1:
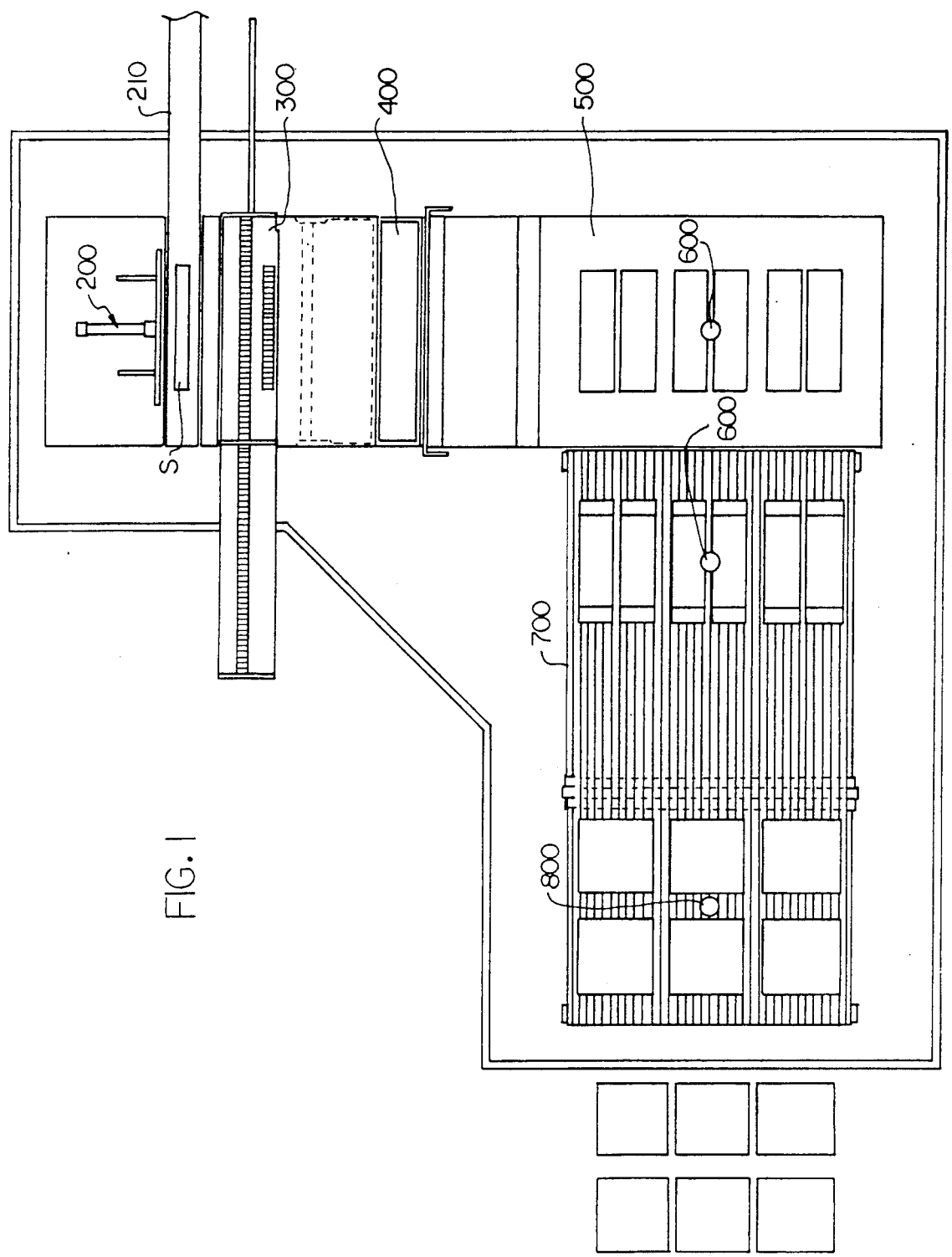
FIG. 1 is a plan view illustrating the apparatus according to the present invention.
Figure 2:
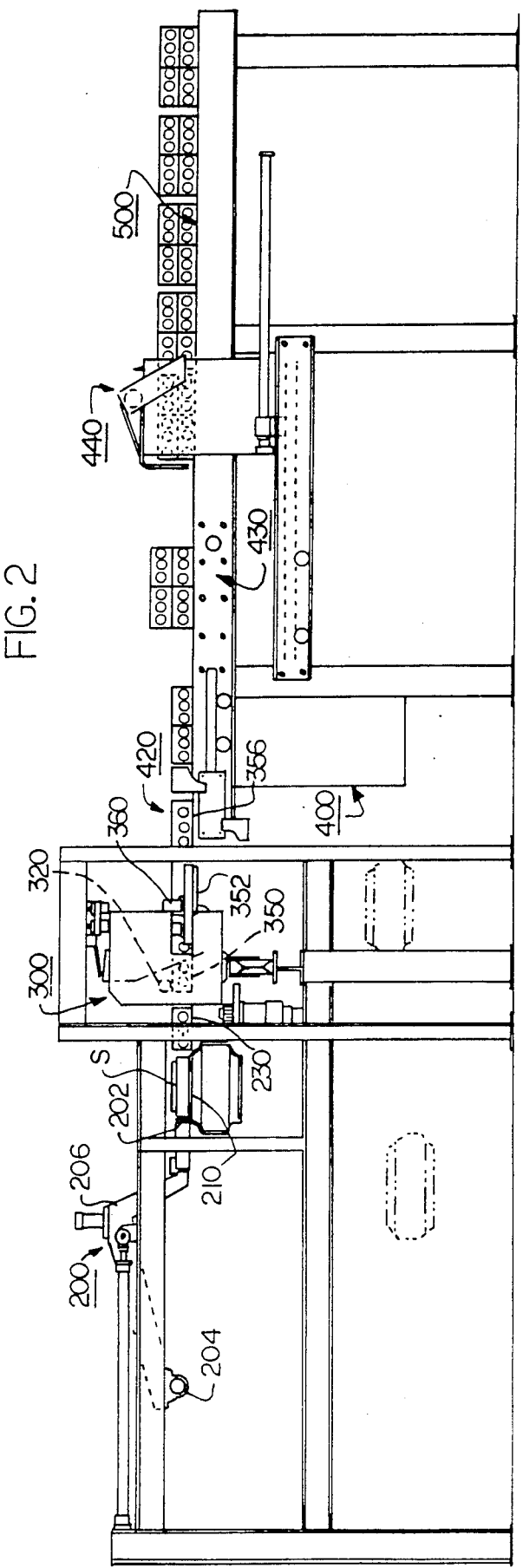
FIG. 2 is a side view illustrating the pusher/cutter assembly and the stacker/elevator assembly of the present invention.
Figure 3:
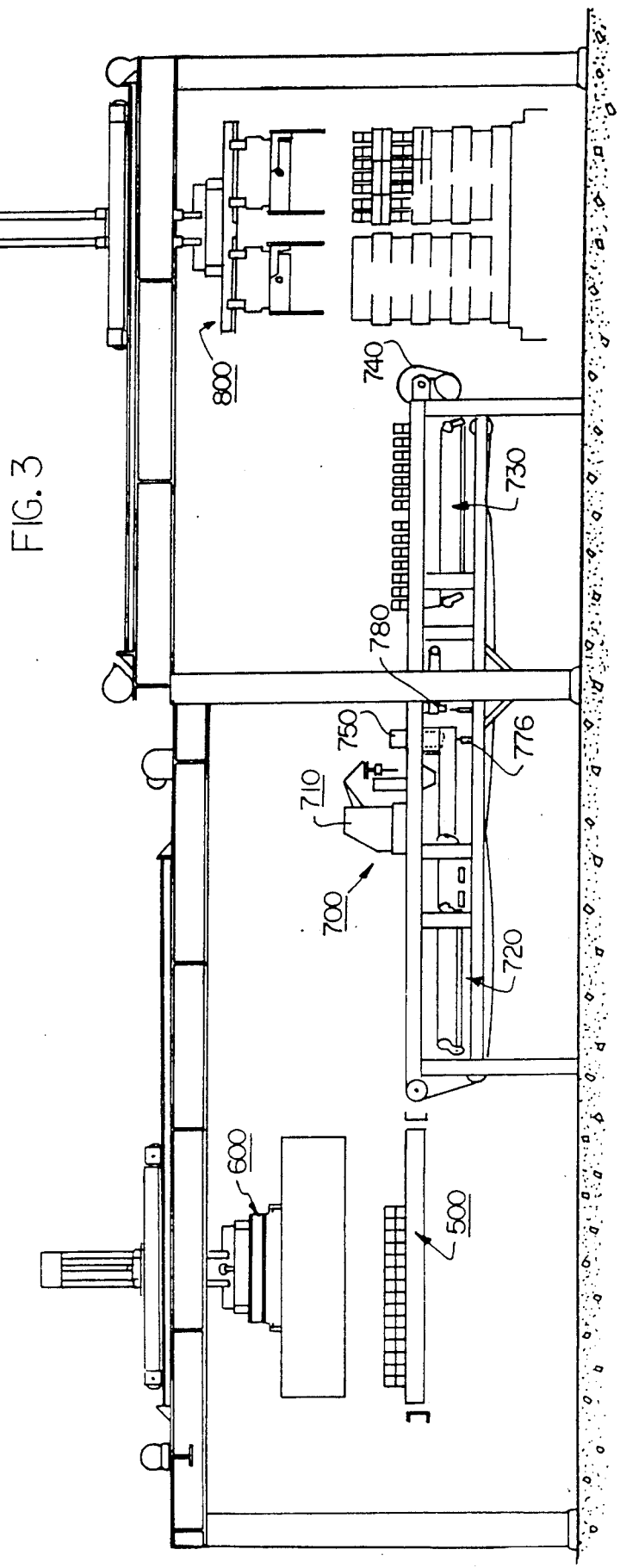
FIG. 3 is a side view illustrating the separation/conveyor assembly and the setter assembly of the present invention.

Referring now to the drawings in general and to FIG. 1 in particular, it will be understood that the illustrations are for the purpose of describing a preferred embodiment of the invention and are not intended to limit the invention hereto.

As best seen in FIG. 1, there is illustrated the overall apparatus according to the present invention. By way of orientation in the system, slugs S of brick are formed by a pug mill extruder (not shown), cut to a length approximating a row of bricks to be processed, and conveyed along an off-bearing conveyor to the pusher assembly, generally designated 200. As each slug reaches the end of the off-bearing conveyor 210, it is stopped and moved by means of a pusher arm 220 onto the front end of a push-off table 230. At this stage the slugs are arranged transversely with respect to the push-off table 230 with a side edge of each slug being up against the side edge of the adjacent preceding and succeeding slugs, so that the slugs are received sideways along the push-off table 230 as the pusher device 200 pushes the ensuing slugs to the front end of the table 230.

As the slugs S are pushed past the wire cutting assembly, the slugs are cut into rows of individual bricks in a well-known and conventional fashion. The details of the cutting assembly, generally designated 300, are described in further detail later. The slugs have now been processed so that they are in the form of rows of individual bricks. The rows extend transversely across the push-off table 230.

As the rows of brick are pushed passed the end of push-off table 230, they are delivered to a stacker/elevator assembly, generally designated 400. The first row of bricks is moved to a first platform 410 of the stacker/elevator. After the elevator assembly 400 has lowered the first platform to a level below the push-off table 230, the second row of bricks is then moved onto a second platform 420, spaced vertically above the first platform 410. The second platform 420 then retracts depositing its rows of bricks on top of the rows of bricks on the first platform 410 beneath. The first platform 410 then moves forward, up, and back home. The next advance of brick from the pusher assembly 200 discharges the double-layered rows of brick on a split plate assembly 430.

A transfer means, which includes a puller bar assembly 440, simultaneously moves both rows of bricks from the split plate onto the upstream entry end of a marshalling conveyor, generally designated 500.

As used herein, the word "rows" may mean a single column of bricks formed from a single slug, or it may mean two or more columns arranged in a side by side or top and bottom relationship.

Once the double layer row is transferred to the entry end of the marshalling conveyor 500, the marshalling conveyor is indexed forward and a second double layer row is positioned adjacent to the first. This process is repeated until a sufficient number of double layer rows have been accumulated for the infeed head and overhead carriage assembly, generally designated 600, to pick up the plurality of double layers and to transfer them to a separation/conveyor assembly, generally designated 700.

After the separation/conveyor assembly 700 has positioned the double rows of bricks in the desired manner, a second pickup head and overhead carriage assembly 800 picks up the completed layer of brick and transfers that layer to its position on a waiting kiln car. A detailed description of each stage of the operation follows.

PUSHER/CUTTER ASSEMBLIES

Turning now to FIG. 4A there is illustrated a perspective view of the pusher/cutter assemblies generally designated 200/300. A push-off table 230 is disposed adjacent to a transversely extending conveyor 210. The conveyor 210 is preferably of the belt type for conveying the slug S from which bricks are formed over rollers into a position for its placement in a longitudinal direction onto support by means of a pusher assembly, generally designated. 200. The pusher engages the far side of the slug S when slug S is conveyed into longitudinal registry with support for displacing slug S onto the support. In actual use, pusher assembly 200, is moved into the position illustrated in FIG. 4A and, after displacing slug S onto the support, is raised, retracted, and lowered into registration with the next slug S on the conveyor for movement to support.

The cushion stop assembly, generally designated 240, is located downstream of the off bearing belt conveyor 210. Also mounted adjacent to the conveyor 210, in order beginning from left to right or from upstream to downstream, is an off-bearing clamp assembly, generally designated 250. The off-bearing clamp assembly 250 includes gripping devices 260 which may be constructed and mounted on opposite sides of the conveyor 210 in any suitable manner such that upon actuation, the same extend towards one another and so grip the bricks then disposed therebetween as to halt advancement of such bricks and others disposed upstream therefrom and coming into engagement therewith the conveyor 210.

The pusher assembly 200 may be mounted and constructed in any suitable manner such that upon actuation thereof, its elongated pusher blade 202, then positioned on the far side of the conveyor 210 as viewed in FIG. 4A, will move forward whatever groups of bricks are at that time adjacent thereto from the conveyor 210 and onto push-off table 230 disposed on the opposite side of the conveyor. The pusher assembly 200 includes an equalizing shaft 204 attached to a pusher arm 206 to prevent any front-to-back misalignment from one end of the pusher arm 206 to the other with respect to cutter bank 300, thereby maintaining a parallel position to the cutter bank 300 as it advances toward the cutter bank 300. This acts in the same manner as a torque arm assembly. The pusher assembly 200, the cushion stop assembly 240, and the off-bearing clamp assembly 250 are so designed and constructed as to, during each cycle of operation, to deaccelerate the advancing slug S at a controlled rate such that crushing or deformation of the unfired "green" bricks does not occur and to cause rapid, positive retraction of the stop means, together with other synchronized components of the apparatus, when a brick grouping of the desired size has accumulated against the cushion stop assembly.

A side-by-side wire cutter assembly, generally designated 300, is located adjacent to the pusher assembly 200. Wire cutter assembly 300 includes a plurality of vertically disposed wires 302, transversely spaced one from the other at a distance equal to one brick width, to cut and form individual, discreet bricks when slug S is displaced longitudinally along the support through the wire cutter, for example, in direction of arrow A as illustrated in FIG. 4A. It will be appreciated that the consistency of the slug, for example, when made by the "stiff mud" process, is such that slug S can be readily cut by wires 302 and formed into individual bricks.

Figure 4B:
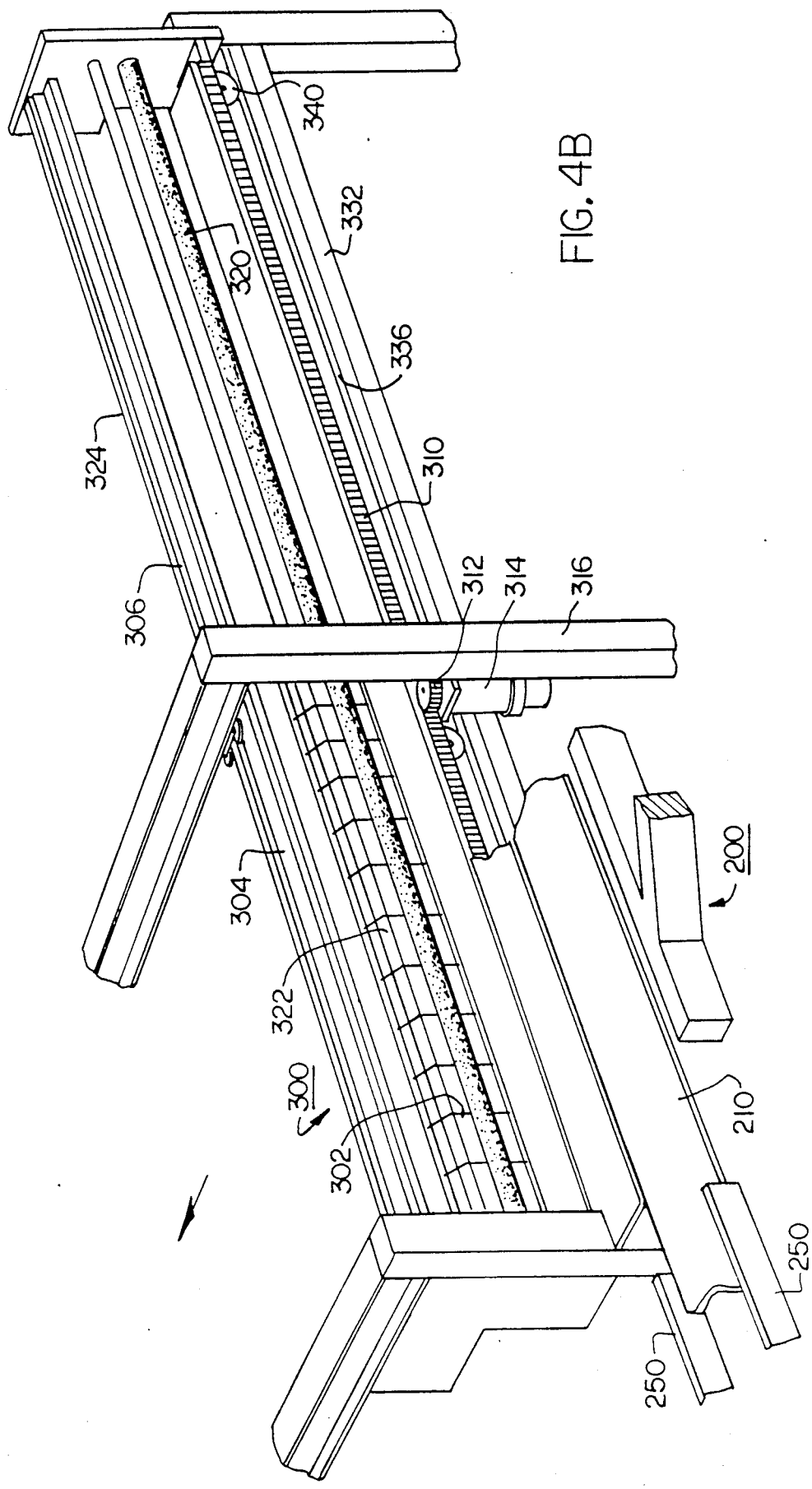

Turning to FIG. 4B, a perspective view of the side-by-side wire cutter assembly 300 is shown looking upstream of the bricks being pushed by pusher assembly 200 from conveyor 210 onto the push-off table 230. The side-by-side cutter assembly includes a double bank wire carriage 304 movably mounted between a top rail 306 and a bottom rail/gear rack 310 which extends transversely across the length of the double bank wire carriage 304. A hydraulic motor 314 is mounted to the support frame 316 and positioned adjacent to a pinion gear 312 for engagement with gear rack 310. The double bank wire carriage 304 includes a pair of roll edge texturizers 320, wire guide bar 322, and spring bar assemblies 324 for attaching the wires 302. A pair of lever switches 326, located one at each end of the spring bar assembly 324, are connected by a rod 330 and actuated by the release of any spring when a wire 302 breaks, thereby actuating an alarm (not shown) to alert the operator.

As best seen in FIG. 4C, the bottom track support 332 is attached to pusher/cutter frame 316 and to support 334. A bottom track 336 is attached to the upper surface of bottom track support 332. A plurality of grooved wheels 340 are located on the undersurface of the double bank wire carriage 304. The gear rack 310 is maintained in position with respect to pinion gear 312 of hydraulic motor 314 by means of cam followers 344. The top rail 306 is attached to the upper surface of the double bank wire carriage 304. A plurality of double pairs of cam followers 344 are located proximately to the top rail 306 and attached to the upper support of pusher/cutter support frame 316. Thus, the side-by-side cutter assembly 300 may be selectively moved from a first operable position to a second inoperable position by actuation of hydraulic motor 314.

The double bank wire carriage 304 includes a first transition plate 350 for receiving slug S from the off-bearing conveyor 210 prior to slug S being pushed through the wire assembly 300 by means of pusher assembly 200. The double bank wire carriage 304 also includes a back transition plate 352 for receiving the bricks after they have been formed by the passage of the slug S through wires 302. Back stops 354 are mounted to the bottom of carriage 304 for engaging the frame 316 during operation of the pusher assembly 200, thereby preventing wheels 340 from moving off of track 336 and eliminating any forward loading on the gear rack 310 and pinion drive 312.

Surge plate 356 is located downstream of transition plate 352. Transition plate 352 includes a dump chute 358 between the two cutter banks. A U-shaped bar 360, located above the dump chute 358 pushes the single row of damaged brick resting on plate 352 into chute 358 when a cutter bank change is made.

Stacker/Elevator Assembly

Figure 5B:
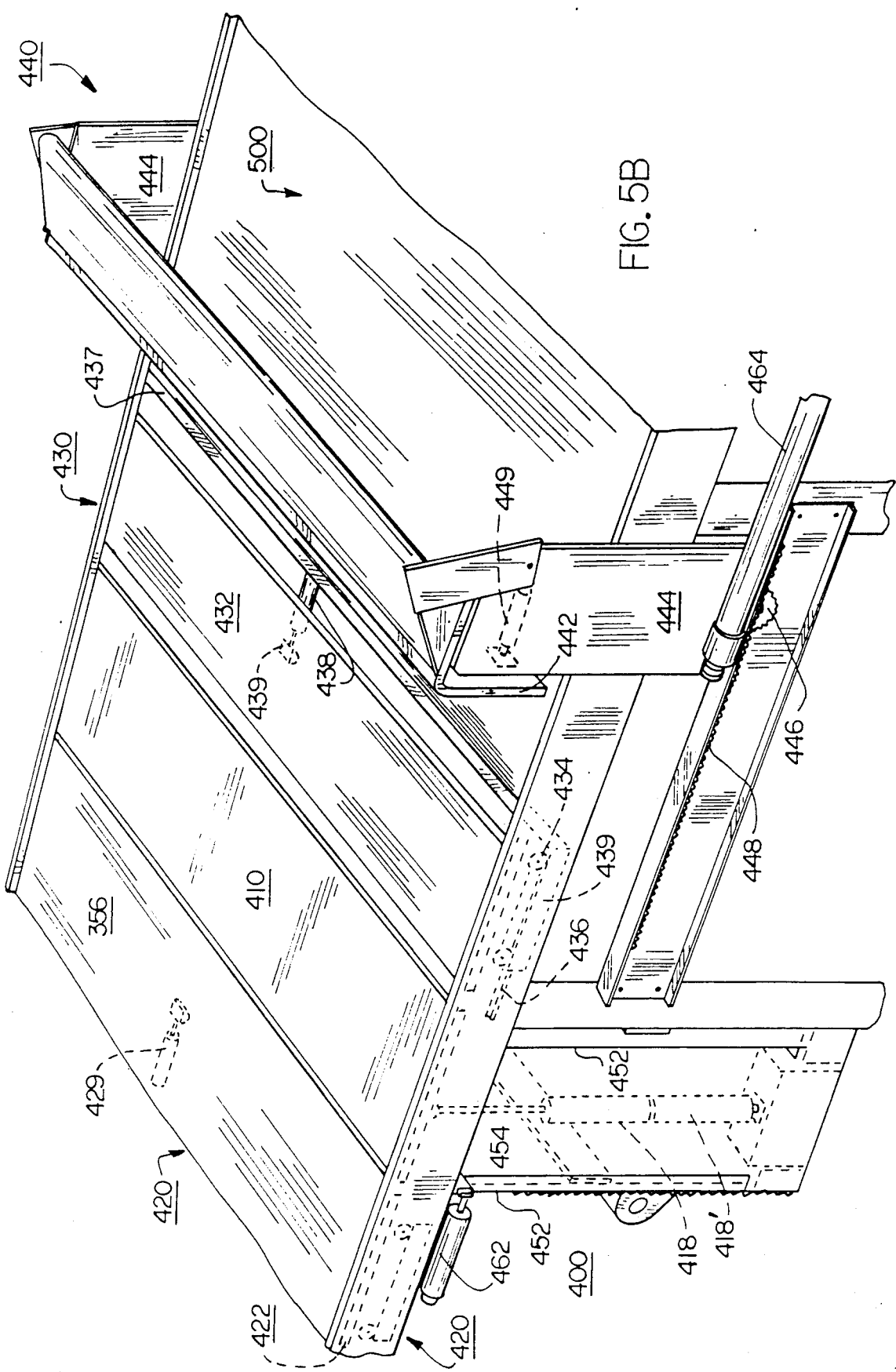

Turning now to FIG. 5A, there is illustrated an enlarged side view of the stacker/elevator assembly, generally designated 400. The elevator assembly 400 is provided with a main frame structure 450 including a pair of vertical support posts 452,453 interconnected by transversely extending cross beams 454 to form the generally upstanding, rectangular cross-section main frame 450, as illustrated in FIG. 5B. A horizontal carriage 412 includes a cam track 414 which extends downstream of the brick path. The upper support plate 410 extends longitudinally across from one pair of vertical support members 452 to the second pair 453. Cam followers 416 are receivably mounted within the vertical support members 452,453 to allow vertical movement of the support plate 410. A hydraulic cylinder 418 extends from the lower portion of carriage 412 to the cross-piece extending between the vertical support members 452,453 at their lower end. A second pair of cylinders 418' are used when face setting with an inverter. In its extended position, the hydraulic cylinder 418 moves the movable support plate 410 from its first position located at the upper end of the vertical support members to a lower position located below the previous level. An equalizing shaft 460 is attached to one vertical support member and extends transversely across the brick path to the second vertical support member. A second hydraulic cylinder 462 is connected to the main frame and vertical support members 452,453 for selectively moving the stacker/elevator assembly 400 from a first position adjacent to the shuttle plate assembly 420 and adjacent to the surge plate 356 to a second position adjacent to the split-plate assembly 430.

The shuttle plate assembly 420 includes a slide plate 422 connected to the slide plate carriage 424. The slide plate carriage 424 includes a pair of cam followers 426 on each end which are receivably mounted for engagement along a cam rail 428 attached to the inner surface of the horizontal support members 454. A hydraulic cylinder 429 is attached to the surge plate 356 at one end and to one side of the slide plate 422 at the other end. The shuttle plate assembly 420 is operable to move the shuttle plate 422 from a first position in abutment with the underside of the surge plate 356 and a second position above the stacker/elevator and extending parallel to the support plate 410 of the stacker/elevator assembly 400.

A split-plate assembly 430 is adjacent to the opposite side of the stacker/elevator assembly 400. The split-plate assembly 430 includes a wear plate 432 having a pair of cam followers 434 mounted to each end of the carriage weldment. A cam track 436 is mounted within the support frame for receiving the pair of cam followers 434. A hydraulic cylinder 438 is horizontally mounted from a pivot bracket 439 attached to the plate assembly frame and to transition plate 437. Thus the split-plate assembly 430 is operable to move longitudinally from a first position adjacent to the transition plate 437 and marshalling conveyor 500 upstream to a second position adjacent to the stacker/elevator support plate 410.

A puller bar assembly 440 includes a puller blade 442 extending vertically and longitudinally across the brick path. The puller blade 442 is pivotally mounted to a pair of side plates 444. The side plates include two pairs of cam followers 446. A cam rail 448 is mounted to a horizontal support frame for receiving the cam followers 446. A hydraulic cylinder 449 is mounted at one end to the pivotable puller blade and at the other end to the side wall of the puller assembly 440. An equalizing assembly 460 extends transversely below the bottom of the puller assembly 440. A second, horizontally extending hydraulic cylinder 464 is attached to the mounting bracket on one surface of the side wall and on the other end to the marshalling conveyor assembly 500 which is conventional in design.

As best seen in FIG. 6, the stacking operation is shown schematically in accordance with the present invention. The bricks are shown on a horizontal path conveyance, a portion of which is formed by a horizontally movable carriage, movable along the conveyor path. In FIG. 6A, the bricks have been formed from slugs which have been pushed from the off-bearing conveyor 210 through cutting wires 302 onto the surge plate 356 which is immediately adjacent the shuttle plate assembly 420. In the typical installation, the off-bearing conveyor 210 moves at right angles to the path for advancing the bricks as they are formed to the cutting wires 302 and subsequently handled. After the bricks are cut, they are sequentially received on the surge plate 356.

The bricks, which are cut from a single slug, lie in a row so that when the bricks arrive on the surge plate, they arrive in rows of one or two etc. The rows of brick extend transversely to the direction of the advance with the adjacent ends of the bricks in each of the rows engaging each other. The number of individual bricks in each row may vary as desired.

Turning to FIG. 6B, the pusher 200 will first make a "short" push on an 8-inch brick which will not advance the train of bricks that are in the wires 302 and on the surge plate beyond. The next push is a "long" push and the slug S2 that is on the off-bearing belt will be advanced forward until it contacts the slug S1 in the "short" push position. Both slugs will continue to advance forward until they contact the row of bricks in the wires 302 which, in turn, pushes the whole brick train forward the equivalent length of two bricks until the slug S2 that came off the off-bearing belt is now the slug that is in the cutter wires. The pusher assembly 200 then is operated to push the next two rows of bricks onto the elevator support plate 410.

Referring to FIGS. 6C and 6D, the stacker/elevator support plate 410 containing at least one row of cut bricks simultaneously is moved forward along the conveyor path and downwardly below the conveyor path, and then rearwardly under the conveyor path until positioned below the surface of the shuttle plate 422 so that bricks on the shuttle plate 422 directly overlie the bricks on the stacker/elevator support plate 410. The upper two rows of brick optionally can be "inverted" by a conventional shuttle device (not shown) to "face" set the stacked bricks. One example of such a device is shown in U.S. Pat. No. 4,326,439 issued to Frost et al, the entire disclosure of which is hereby incorporated by reference.

Turning to FIG. 6E, after at least one row of bricks has been processed onto stacker/elevator support plate 410, the shuttle plate 422, stored underneath the surge plate 356, is moved along a path of advance indicated by the arrow. The pusher assembly 200 then cycles again, as shown in FIG. 6F. Another short push is made and then a long push and two more rows of brick are advanced off the end of the stationary surge plate onto the upper surface of the shuttle plate 422 in its forward position as shown in FIG. 6F.

As shown in FIG. 6F, the shuttle plate 422 completely overlaps the support plate 410 of the stacker/elevator. During this step, new rows of bricks continue to be formed sequentially by pushing slugs S through cutting wire 302 and onto the surge plate 356 as shown in the previous figures.

Referring now to FIG. 6G, the shuttle plate 422 is moved back underneath the surge plate 356. The bricks that are on the surge plate of the push-off table serve as a rake-off bar. Thus, the two rows of bricks that were once on the shuttle plate 422 are deposited on the two rows of bricks on the stacker/elevator assembly's support plate 410.

After the bricks have been stacked on the stacker/elevator support plate 410, the stacker/elevator support plate 410 then moves away from shuttle plate 422, up, and back "home" to restore it to the level of the horizontal path of conveyance, as illustrated in FIG. 6H. At this point two courses high of brick are on the stacker/elevator with the bottom course being level with the row of brick in the train on the surge plate 356. Before the next advance, the split plate 432 comes back "home" from its forward rightmost position out of the way and moves back toward the stacker/elevator assembly 400.

The pusher 200 then pushes another short push and then a long push and, as a result, the bottom row of brick, which is the main train, advances two more rows of brick onto the stacker/elevator 400 thus pushing the double-course high group of brick onto the split plate 432 as shown in FIG. 6I. The split plate 432 then must "split away," and create a gap not only for the stacker/elevator 400 to accomplish its two inch shift or split, but also to allow the puller bar blade 442 room to come down in behind those brick. The puller bar blade 442 comes down and pulls the double-course, two rows of product onto the marshalling conveyor 500 to a fixed position. The conveyor then advances according to the commands from the servo drive, as shown in FIG. 6J.

The sequence of operations shown in FIG. 6 are repeated until the marshalling conveyor 500 obtains a full complement of stacked courses of bricks.

As discussed above, once a predetermined number of double-layer rows have been positioned on the marshalling conveyor 500, the overhead carriage assembly and infeed head assembly 600 tranfers the double-layer rows from a first position on the marshalling conveyor 500 to a second position on the infeed end of the separation conveyor 700. Both the overhead carriage assembly and infeed head assembly 600 may be of various, conventional types and neither the overhead carriage assembly nor the infeed head assembly 600 form a part of this invention.

SEPARATION CONVEYOR ASSEMBLY

As can best be seen in FIG. 7B, the separation conveyor assembly 700 comprises approximately thirty parallel, 1½" spaced apart, 1½" wide belts 702 for suitably supporting the rows of brick and to permit a number of individual lifting elements to be located in the 1½" wide spaces between each of the belts. The double-layer rows of bricks are conveyed by the movement of the spaced apart belts 702 against a stop blade 712 of a stop and hold down assembly 710 and aligned thereby. An infeed/lift assembly 720 is located underneath and between the spaced belts 702 for raising the rows of bricks, other than the row adjacent to the stop blade 712, from off the surface of the conveyor. A tiltable rake off bar 714 prevents adjacent bricks from also raising up. The stop blade 712 of the stop and hold down assembly is lifted, lift assembly 720 is raised, and the conveyor is actuated to allow the adjacent row to move forward. The infeed/lift bar assembly 720 is then lowered, thereby lowering previous rows of the bricks thereon onto the surface of the conveyor. In this manner, rows of previously edge or face set bricks are separated and conveyed downstream.

Infeed lifting elements 722 and the lift assembly 720 are connected by means of a solid shaft 724 at the pivot point 726 such that movement of one lifting element is synchronized with the movements of all the other lifting elements. The movement of the conveyor is programmed and controlled with conventional hardware such that the spacings between individual setting layers can be varied.

As best seen in FIG. 7A, two hacks are shown, hack 1 which is the right-hand hack, and hack 2 which is the left-hand hack. Those two hacks are subsequently combined to complete a layer. In addition, hacks 1 and 2 each have three hacks in a row across the table. Thus, there are actually six hacks being developed at one time but one row of three hacks is called hack 1, and then hack 2 which is the next three.

The infeed lift bars 722 raise all of the product behind the rake off bar 714 that is positioned to the right of the upstream end of the lift bars 722 when edge or face setting. Thus, as the infeed lift bars 722 raise the product, any brick sticking together will contact the rake off bar 714 which nudges down the ones that are being separated from the rest of the family of product. The rake off bar 714 is pivotally mounted for slight up and down movement to prevent buildup. The bricks that are setting on the conveyor to the right of this point will be advanced some predetermined amount by the conveyor belts 702 to create a gap.

The rake off bar 714 is set slightly above whatever height product it is running. Hand cranks 716 allow the rake off bar 714 height to be quickly adjusted to a point that is just above the product height of a double-course product. The ability of the rake off bar 714 to be adjusted and its up and down tilt capability enhance its ability to accommodate slight variations in the height of a given product.

1) Edge Setting Sequence

FIGS. 8A–8F schematically illustrate the brick movement through the separator/conveyor during the "edge or face setting" operation. During edge or face setting, the first move will be a brick move which will advance the whole group of product. Before the first brick move occurs, the stop blade 712 must be down and the product will push up against the stop blade 712. For each particular product, a threaded rod 718 provides means to adjust the stop blade quickly.

As the brick come forward they will contact the near side of the stop blade 712 in its down position. The stop blade 712 is positioned one brick width just to the right of the end of the infeed lift bar 722 so all of the last brick is off of the lift bar 722 and to its right. An extra quarter of an inch is normally allowed so it would be a brick width plus a quarter of an inch to the stop blade 712 from the end of the lift bar 722. Thus, when the infeed lift bars 722 are activated, only the brick that are remaining above are lifted. The brick resting on the conveyor belt 702 moves forward independent of the rest that were lifted and held back after the stop blade 712 is raised up.

Thus, when the separation conveyor 700 advances forward during edge or face setting, the process flow is very simple. First, the stop blade 712 comes down and the brick bump against it (see FIG. 8A). The stop blade 712 then raises and the first conveyor brick move is made (see FIG. 8B). Note that a "token" brick move will result in a single rather than a pair set. Then the infeed lift bars 722 are activated and the product, other than the brick which was against the stop blade 712, is raised off the conveyor (see FIG. 8C). At the same time, the rake off bar comes down against the first brick past the edge of the infeed lift bars 722 in a shearing motion. Then the conveyor moves the brick forward that have just been sheared off creating a gap between them and the brick on the infeed lift bars 722. The infeed lift bars 722 are then lowered (see FIG. 8D) and the process is repeated.

Thus, the first move will always be a "brick move" during edge or face set pattern development. Then there will be a gap move, a brick move, a gap move, and so on by drive assembly 740 (see FIGS. 8A–8D).

The stop blade 712 is lowered at the end of every hack and is raised up at the beginning of every hack. In the middle and end of every layer, the stop blade 712 also goes down when the infeed head 600 comes over to set a new load down. Otherwise, since the head does not advance when in the lowered position, an undesirable gap would be created between the new brick being set down on the separation conveyor and those bricks remaining in the surge area of the separation conveyor (see FIG. 8E).

When the infeed head comes down over the belt, a first electric eye 742, back to the left of the separation point, produces a signal that indicates the minimum surge exists that can still create a hack without any gaps. Thus, when the product should be at the separation point between the end of the lift bars 722 and the turnover assembly 750, sensor 742 assures that brick are there and not a gap. The particular location of the sensor 742 is chosen based on an analysis of brick types and their various widths and patterns, and the "worst case" pattern developed for each. A second electric eye 743 further left of the separation point produces a signal that indicates when a new load has been deposited.

When the first hack has been developed for the edge or face set pattern only, and before the separation conveyor makes the final gap move to create the center flue, the separation conveyor is run one brick width plus four inches of that gap. The stop blade 712 is lowered before the rest of that run out move is made (see FIG. 8G). This same operation of the separation conveyor 700 and stop blade 712 is utilized after the development of hack 2 as well.

Where the infeed head 600 sets down there will be a gap from four to six inches between the leading edge of the new brick that have been delivered to the separator conveyor and the end of the surge area that were already on the conveyor. Before that gap can migrate forward to the separation point at the end of the lift bars 722 and at the entry side of the turnover assembly 750, the stop blade 712 is dropped down to collect the brick during both the long run in between the two hacks and at the end of the layer after hack 2 when both hacks are being moved out for pick up.

Therefore, on edge or face set only, the blade 712 is down and the brick have been collected at that point so they start off from a known point with respect to the centerline of the pickup head 800 every time. The stop blade 712 then is raised and a brick move is then made. It might be only an eighth of an inch, which is a "token" move made when just one brick is desired and not a pair set.

Thus, the separation conveyor drive 740 will make a brick move, then the lift bars 722 will be raised keeping all the brick that are not to be advanced, lifted. Now the separation conveyor advances a gap move. The infeed lift bars 722 are lowered and a brick move is made. The lift bars 722 are raised and a gap move is made, and so on successively until hack 1 is completed. (see FIGS. 8A–8D).

When the last brick move of hack 1 is made and the infeed bars 722 are lifted, the separation conveyor drive 740 is run one brick width plus four inches (see FIG. 8G). The separation conveyor drive 740 is stopped, the stop blade 712 is lowered in the gap that was created, and at the same time, the infeed lift bars 722 are lowered (see FIG. 8H). Now the separation conveyor drive 740 completes the rest of either the between hacks or run-out moves.

Because of this particular arrangement, if the infeed load is set down and there is a four inch gap, the stop blade 712 will be down during the rest of the run-out move so that the surge brick will come forward and bump the stop blade. The brick will be accumulated by dragging them over the belts and collected up against the surge. Then, when that move is complete, the stop blade 712 will raise, another brick move is made, whether for a token move or for a pair set, then a gap move is made, a brick move, a gap move, and so on to complete hack 2. Finally, next, a brick plus four inch move is made on the first gap after the last brick, the blade 712 is dropped, the infeed lift bars 722 are lowered, and the separation conveyor drive 740 makes a long run out move to position hack 1 and hack 2 centered on the outfeed end of the separation conveyor for pick up (see FIG. 8I). At that point, the outfeed lift bars 732 raise both hacks for pick up (see FIG. 8J). For setting on the car, the heads 800 are closed together to set the proper flue space on the car. Then, the separation conveyor is advanced again to start building the next layer.

When the next layer is being developed, if for some reason the outfeed head 800 was delayed and it does not get back over and pick up, a third electric eye 744 is positioned near the area where interference with the outfeed head 800 would occur. If the brick begin to encroach that area, the separation conveyor drive 740 is stopped so it cannot continue to make another layer or the rest of a current layer until the outfeed head 800 picks up.

2) Flat Setting

As can best be seen in FIG. 7A, the separation conveyor assembly 700 includes a turnover assembly 750. The turnover assembly 750 includes a turnover frame 752 having a rotatable, turnover rotor 754 mounted thereon. The turnover rotor 754 includes a plurality of adjustable length extension plates. The turnover rotor 754 is attached to the rotor shaft 760 of the turnover assembly. A sensor actuator wheel 762 and sensor actuator 764 are connected to the rotor shaft 760 to provide a control signal indicative of the position of turnover rotor 754. The turnover rotor 754 is connected to a hydraulic motor 766 by a gear reducer 770. The turnover frame 752 includes a first horizontal member 772 connected to the turnover rotor drive motor 766. A second vertical arm 774 is connected at right angles to the lower end of the turnover frame 752 and extends downwardly to a point whereby it is attached to one end of a hydraulic cylinder 776. The other end of the hydraulic cylinder 776 is attached to the conveyor assembly 700 frame. By this means, the turnover rotor 754 may be moved from a first inoperative position below the surface of the conveyor to a second operative position parallel to the surface of the conveyor.

The hydraulic motor 766 is actuated by the control means (not shown) to incrementally rotate the turnover rotor 754 by 90 degrees. This rotation tilts the rows of bricks loaded onto the adjustable extension plates 756 into a "flat" set position downstream onto the conveyor and, at the same time, positions the next set of extension plates 756 in place for the next loading. The adjustable extension plates are adjusted quickly through the use spring detent pins to snap into the appropriate indentations. Downstream of the turnover assembly 750, a separator bar assembly 780 is activated, similar to the operation of infeed lift assembly 720, discussed above, to separate the rows of flat set brick.

FIGS. 9A–9F schematically illustrate the brick movement through the separation conveyor 740 during the "flat" setting operation.

In operation, if a flat set layer is chosen after an edge set layer, the stop blade 712 is already down and the same starting point at the first part of a flat set layer applies (see FIG. 8I and 9A). The brick are a certain distance from the near edge of the turnover rotor 754 and as soon as the runout is completed, the turnover rotor 754 and the stop blade 712 are raised (see FIG. 9B).

At this point, the separation conveyor drive 740 makes a "C1" move, i.e. a predetermined constant move for each particular brick size (see FIG. 9C). The stop blade 712 will always be in a fixed position for each particular brick size. For example, from the inside edge of the stop blade 712 to the near edge of the turnover rotor 754 for modular brick is 5½ inches. Thus, the "C1" move for modular brick will be 5½ inches.

Thus, after the stop blade 712 is raised, the separation conveyor drive 740 is run forward 5½ inches, thereby positioning the proper number of brick, two courses high, up against the turnover. Once the C1 move is complete, the rotation of the turnover rotor 754 occurs. the brick are rotated 90° and onto the other side of the turnover rotor 754, leaving a gap on the left side of the turnover rotor 754 (see FIG. 9D). The conveyor belt 702 has been kept stationary and the turnover rotor has merely picked the brick up and laid them down on the other side of the turnover.

The next move is a C2 move or a "runout" move (see FIG. 9E). C2 is a constant move as well and is two times the brick bed depth plus ½ inch. The brick bed depth is the height of the brick when it was setting in an edge set pattern. For unfired modular brick the brick bed depth is 3.8125 inches. Thus, the C2 move or runout for modular brick is approximately 3.8125 times 2 plus ½ inch or 8.125 each. On a flat set, two brick laying on their side plus ½ inch will always be greater than the dimension that is on the left side of the turnover when the brick were in their edge or face set pattern. Therefore, when the brick are up against the turnover rotor 754 on the left, only one rotation move is necessary since when the runout move on the right side is made, the brick move in on the left at the same time. Thus, the C1 move only occurs on the first move of a flat set layer period and only on hack 1. The C2 move, i.e. the runout move, puts the two flat set brick out in a position to where the back row is right over the separation lift bars 782. The separation lift bars 782 may be adjusted by a hand crank 784 for the particular position for the certain size brick being run. After a C2 move is made, the separation lift bars 782 are raised and a gap is run between the front row of brick and the back row that's being lifted up off the conveyor. The gap move also collects the brick further back at the turnover (see FIG. 9F).

There is an existing ½ inch gap between the position that the brick occupies over the separation lift bars 782 and the leading edge of the next brick which has just been rotated over. If more of a gap than ½ inch is desired, for example, 1½ inches, the second row is set down and the separation conveyor drive 740 is run one inch before the turnover 754 rotates the next layer in order to produce the 1½ inch gap when the brick are rotated over (see FIG. 9G).

Thus, a C1 move is made at the very start of the layer, then a C2 or runout move is made after each rotation has occurred, then the separation lift bars 782 are raised, a gap move is made, the separation lift bars 782 are lowered and another gap move is made. Then the turnover 754 rotates the next group of brick over and another C2 move is made. Therefore, after the first C1 move, the sequence of moves in a flat set hack development is C2, gap gap, C2, gap gap, C2, gap gap (see FIGS. 9E–9G).

When the last rollover of hack 1 is completed, the stop blade 712 does not have to be dropped because the turnover 754 itself serves as a stop and collects any brick gap or any gap that the infeed head 600 had created at set down. After the hack 1 is developed on the flat set, the separation conveyor drive 740 starts off C2, gap gap, C2, gap gap, C2, gap gap, without the need for a C1 move. However, when hack 2 is completed, a flat set brick cannot be left setting out since this would produce an uneven number in a complete layer. In addition, all of the flat set bricks must be accounted for because an edge or face set layer may be coming up next.

Therefore, when the last turnover for hack 2 is made and while the gap is still on the left hand side of the turnover rotor 754 and the drive 740 has not been advanced to run the brick out, the stop blade 712 is dropped in (see FIG. 9H). Then the C2 move is made, the separation lift bars 782 are raised, and the first gap move is made, then the separation lift bars 782 are lowered and the second gap move is made (see FIGS. 9E, 9F, 9G). At this point, the separation conveyor drive 740 will receive information from the control system as to whether it is another flat set layer requiring the turnover rotor 754 up or an edge or face set layer requiring the turnover rotor 754 down. In either case, the position of the brick is known because the stop blade 712 is down and the brick are up against it. So if it's the flat set, another C1 move is made; if it's an edge set, a brick move is made, and a gap move, brick, gap, etc.

The changeover to flat setting is effected during the ongoing operation of the conveyor 700 by raising the turnover assembly 750 into position for operation at the appropriate time to allow continued operation. Thus, the change from "edge" or "face" to "flat" setting is affected by simply engaging or disengaging the turnover assembly 750 in sequence with the separation conveyor drive 740.

The rows of "flat set" or "stacked" or "faced" bricks continue downstream of the conveyor assembly 700 to a point where a conventional overhead carriage assembly, connected to a 6-hack or 4-hack head assembly 800 is operable to lift the courses of brick from the conveyor assembly 700 and stack the brick into hacks on a kiln car adjacent to the conveyor assembly 700. The head and carriage assembly 800 have the capability for rotating the groups of bricks 90° whereby the groups can be alternately stacked 90° to each other. When the kiln car load has been completed, the bricks are transported to a kiln for firing by conventional means.

It should be understood that suitable electronics such as limit switches and encoders and other electronic sensing devices, including counters, and programmable controllers are suitably selected and mounted to operate the machine in accordance with the desired program of operation. Since such electronic components are well-known, they have not been described herein in order to simplify the understanding of this machine. Also, while hydraulic or pneumatic cylinders are the preferred actuators, others might be employed with equal success without deviating from the intent of the present invention.

Certain modifications and improvements will occur to those skilled in the art and reading of the foregoing description. By way of example, the design of the stacker/elevator and puller bar assembly permits a conventional inverter to be added above the stacker/elevator to permit "face" setting also. Thus, the present invention is operable to selectively edge, face, or flat set. It should be understood that all such modifications and improvements that have been deleted herein for the sake of conciseness and readability fall properly within the scope of the following claims.

We claim:

1. An apparatus for stacking single layer rows of slugs from a grouping area into multi-layer rows, comprising:
    (a) pusher means adjacent to said grouping area for sequentially moving the slugs transversely to their longitudinal axis;
    (b) elevator means downstream of said pusher means for receiving the slugs from said pusher means, said elevator means including a platform and means for vertically moving said platform whereby succeeding slugs are delivered to said platform to form two layers;
    (c) shuttle means located between said pusher means and said elevator means, said shuttle means including a shuttle plate and means for selectively moving said shuttle plate between an operable position and an inoperable position with respect to said elevator means, wherein said shuttle means further includes a push-off table adjacent to said pusher means for receiving the slugs from said pusher means, a frame for supporting said push-off table, hydraulic cylinder means connected between said frame and said shuttle plate for moving said shuttle plate in a horizontal plane below said push-off table, and guide means engaged with said shuttle plate and supported by said frame for guiding said shuttle plate as it is moved in a horizontal plane below said push-off table;
    (d) a marshalling table located downstream of said elevator means for receiving the slugs from said elevator means; and
    (e) control means connected to said pusher means, shuttle means, and said elevator means whereby said pusher means, shuttle means, and said elevator means are operated in a cooperative relationship such that succeeding slugs are delivered to said shuttle plate by said pusher means and displaced from said shuttle plate to form two layers upon said platform.

2. The apparatus according to claim 1, wherein said means for vertically moving said platform includes means for separating slugs on said platform from adjacent slugs moved by said pusher means before said platform begins any substantial vertical movement.

3. The apparatus according to claim 2, wherein said means for separating slugs on said platform from adjacent slugs moved by said pusher mean before said platform begins any substantial vertical movement includes hydraulic cylinder means connected to said platform for offsetting said platform downstream from said pusher means.

4. The apparatus according to claim 2, wherein said means for separating slugs on said platform from adjacent slugs moved by said pusher means before said platform begins any substantial vertical movement and said means for vertically moving said platform are actuated simultaneously.

5. The apparatus according to claim 2, wherein said means for separating slugs on said platform from adjacent slugs moved by said pusher means before said platform begins any substantial vertical movement and said means for vertically moving said platform are actuated sequentially.

6. The apparatus according to claim 1, wherein said elevator means includes a frame, hydraulic cylinder means connected between said frame and said platform for moving said platform vertically, guide means engaged with said platform and supported by said frame for guiding said platform as it is moved vertically, and means for interconnecting said frame and said platform for maintaining alignment of said platform with respect to said frame as it is moved vertically.

7. The apparatus according to claim 6, wherein said means for interconnecting said frame and said platform for maintaining alignment of said platform with respect to said frame as it is moved vertically includes a torsional alignment assembly operatively connected between said platform and each side of said frame.

8. The apparatus according to claim 7, wherein said torsional alignment assembly includes an equalizing shaft rotatively and transversely mounted to said platform and a linear gear rack mounted to said frame and adapted to engage each end of said equalizing shaft such that as said platform moves vertically within said frame, said alignment assembly maintains alignment of said platform with respect to said frame.

9. The apparatus according to claim 1, further including split plate means located between said elevator means and said marshalling table, said split plate means including means for selectively moving said split plate means between an operable position and an inoperable position with respect to said elevator means.

10. The apparatus according to claim 9, wherein said split plate means includes a frame, a split plate, hydraulic cylinder means connected between said frame and said split plate for moving said split plate in a horizontal plane above said marshalling table, guide means engaged with said split plate and supported by said frame for guiding said split plate as it is moved in a horizontal plane adjacent said marshalling table, control means connected to said pusher means, said elevator means, and said split plate means whereby said pusher means, said elevator means, and said split plate are operated in a cooperative relationship such that layers of slugs are displaced from said platform and delivered to said split plate by said pusher means.

11. The apparatus according to claim 1, further including puller means located between said split plate means and said marshalling table, said puller means including a puller and means for selectively moving said puller between an operable position and an inoperable position with respect to said split plate means.

12. The apparatus according to claim 11, wherein said puller means includes a frame, hydraulic cylinder means connected between said frame and said puller for moving said puller in a horizontal plane above said marshalling table, guide means engaged with said puller and supported by said frame for guiding said puller as it is moved in a horizontal plane above said marshalling table, means for interconnecting said frame and said puller for maintaining alignment of said puller with respect to said frame as it is moved in a horizontal plane above said marshalling table, control means connected to said split plate means and said puller means whereby said split plate and said puller are operated in a cooperative relationship such that layers of slugs are displaced from said split plate and delivered to said marshalling table by said puller.

13. The apparatus according to claim 12, wherein said means for interconnecting said frame and said puller for maintaining alignment of said puller with respect to said frame as it is moved horizontally includes a torsional alignment assembly operatively connected between said puller and each side of said frame.

14. The apparatus according to claim 13, wherein said torsional alignment assembly includes an equalizing shaft rotatively and transversely mounted to said puller and a linear gear rack mounted to said frame and adapted to engage each end of said equalizing shaft such that as said puller moves horizontally within said frame, said alignment assembly maintains alignment of said puller with respect to said frame.

15. A machine for receiving and grouping rows of unfired brick, comprising:
 (a) a conveyor assembly for conveying the bricks having a plurality of parallel, spaced-apart conveying means for moving the bricks in a longitudinal direction;
 (b) stop means for engaging and stopping the movement of bricks therepast;
 (c) a first lift means disposed in spaces between said conveying means and between one end of said conveyor assembly and said stop means for lifting and redepositing a portion of the bricks upstream of said stop means from and onto said conveying means;
 (d) a second lift means disposed in spaces between said conveying means and between the other end of said conveyor assembly and said stop means for lifting a portion of the bricks downstream of said stop means from said conveying means; and
 (e) control means connected to said conveyor assembly, stop means, and first lift means whereby said conveyor assembly, stop means, and first lift means are sequentially operated in a cooperative relationship to space the rows of brick apart in the longitudinal direction of conveyance and at predetermined intervals as they are conveyed downstream to said second lift means.

16. The apparatus according to claim 15, wherein each of said conveyor means is a continuous belt conveyor.

17. The apparatus according to claim 16, wherein said continuous belt conveyor is cogged along its inner surface to prevent slippage.

18. The apparatus according to claim 16, wherein said conveyor assembly includes a drive means connected to said conveyor means.

19. The apparatus according to claim 18, wherein said drive means is a servo motor.

20. The apparatus according to claim 18, wherein said conveyor assembly further includes an encoder means connected to said conveyor means for providing an electrical signal indicative of the position of said conveyor means.

21. The apparatus according to claim 20, wherein said conveyor assembly further includes a control circuit connected between said encoder means and said drive means for controlling the position of said conveyor means.

22. The apparatus according to claim 15, further including a third lift means disposed in spaces between said conveying means and between said stop means and said second lift means for lifting and redepositing a portion of the bricks downstream of said stop means from and onto said conveying means.

23. The apparatus according to claim 22, further including control means connected to said conveyor assembly, stop means, and third lift means whereby said conveyor assembly, stop means, and third lift means are sequentially operated in a cooperative relationship to space the rows of brick apart in the longitudinal direction of conveyance and at predetermined intervals as they are conveyed downstream to said second lift means.

24. The apparatus according to claim 15, further including a turnover means disposed in spaces between said conveying means and between said stop means and said second lift means for lifting, rotating 90 degrees from vertical and redepositing a portion of the bricks downstream of said stop means from and onto said conveying means.

25. The apparatus according to claim 24, wherein said turnover means includes a turnover rotor and means for selectively moving said turnover rotor between an operable position and an inoperable position with respect to said conveying means.

26. The apparatus according to claim 25, wherein said turnover rotor includes a shaft having a plurality individual lifting bars, said bars being adjustable to engage brick of various sizes.

* * * * *